United States Patent
Dai et al.

(10) Patent No.: US 12,370,495 B2
(45) Date of Patent: Jul. 29, 2025

(54) FLUORINATED NANOPOROUS MOLECULAR SIEVE MEMBRANES FOR EFFICIENT GAS SEPARATION

(71) Applicant: UT-Battelle, LLC, Oak Ridge, TN (US)

(72) Inventors: Sheng Dai, Knoxville, TN (US);
Zhenzhen Yang, Knoxville, TN (US);
Ilja Popovs, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 542 days.

(21) Appl. No.: 17/842,189

(22) Filed: Jun. 16, 2022

(65) Prior Publication Data

US 2023/0001350 A1    Jan. 5, 2023

Related U.S. Application Data

(60) Provisional application No. 63/211,616, filed on Jun. 17, 2021.

(51) Int. Cl.
*B01D 53/22* (2006.01)
*B01D 69/12* (2006.01)
(Continued)

(52) U.S. Cl.
CPC ........... *B01D 53/228* (2013.01); *B01D 69/12* (2013.01); *B01D 71/021* (2013.01); *B01D 71/28* (2013.01);
(Continued)

(58) Field of Classification Search
CPC .... B01D 53/228; B01D 69/12; B01D 71/021; B01D 71/28; B01D 71/80; B01D 71/82; B01D 2323/30; B01D 2325/04
See application file for complete search history.

(56) References Cited

U.S. PATENT DOCUMENTS 5,320,650 A * 6/1994 Simmons ........... C08G 73/1039
521/64
5,759,237 A * 6/1998 Li ...................... B01D 53/228
95/149

(Continued)

OTHER PUBLICATIONS

Vukovic, V.D., et al., "Catalytic Friedel-Crafts Reactions of Highly Electronically Deactivated Benzylic Alcohols", Angew. Chem. Int. Ed. 2017, Manuscript received: Dec. 27, 2016, Final Article published: Feb. 3, 2017, pp. 3085-3089, 56.

*Primary Examiner* — Anthony R Shumate
(74) *Attorney, Agent, or Firm* — Scully, Scott, Murphy & Presser, P.C.

(57) ABSTRACT

A crosslinked microporous membrane (crosslinked polymer) composition useful in gas separation, the membrane comprising: (i) an aromatic polymer containing a multiplicity of benzene rings; and (ii) a multiplicity of fluorinated aromatic moieties, each fluorinated aromatic moiety containing at least two separate methylene ($-CH_2-$) linkages connected to benzene rings on the aromatic polymer; wherein the cross-linked microporous membrane possesses micropores having a pore size of up to 2 nm. Also described are methods for producing the crosslinked polymer and a microporous carbon material produced by pyrolysis of the crosslinked polymer membrane. Also described are methods for using the crosslinked polymer and microporous carbon material for gas or liquid separation, filtration, or purification.

22 Claims, 22 Drawing Sheets
(20 of 22 Drawing Sheet(s) Filed in Color)

(51) Int. Cl.
*B01D 71/02* (2006.01)
*B01D 71/28* (2006.01)
*B01D 71/80* (2006.01)
*B01D 71/82* (2006.01)

(52) U.S. Cl.
CPC .......... *B01D 71/80* (2013.01); *B01D 71/82* (2013.01); *B01D 2323/30* (2013.01); *B01D 2325/04* (2013.01)

(56) References Cited

U.S. PATENT DOCUMENTS

| | | | | |
|---|---|---|---|---|
| 7,758,751 | B1* | 7/2010 | Liu | B01D 53/228 |
| | | | | 95/45 |
| 8,545,606 | B2* | 10/2013 | Koros | C10L 3/104 |
| | | | | 96/14 |
| 2003/0143341 | A1* | 7/2003 | Lee | H01L 21/02282 |
| | | | | 257/E21.264 |
| 2005/0165172 | A1* | 7/2005 | Kerres | C08J 5/2256 |
| | | | | 525/359.1 |
| 2008/0051479 | A1* | 2/2008 | Luzinay | H01M 8/1072 |
| | | | | 521/27 |
| 2015/0165383 | A1* | 6/2015 | Liskey | B01D 53/228 |
| | | | | 521/53 |
| 2016/0263530 | A1* | 9/2016 | Arnusch | B01D 67/0006 |
| 2018/0169593 | A1* | 6/2018 | Jaber | B01D 71/08 |
| 2021/0093995 | A1* | 4/2021 | Laruelle | B01D 71/48 |
| 2022/0145008 | A1* | 5/2022 | Yang | B01D 71/32 |
| 2023/0014901 | A1* | 1/2023 | Kerres | B01D 71/32 |

\* cited by examiner (3B)

(3C)

(3D)

(3E)

(3F)

(4B)

(4C)

(4D)

(4E)

(5B)

(5C)

(5E)

(5F)

FLUORINATED NANOPOROUS MOLECULAR SIEVE MEMBRANES FOR EFFICIENT GAS SEPARATION

CROSS-REFERENCE TO RELATED APPLICATIONS

The present application claims benefit of U.S. Provisional Application No. 63/211,616, filed Jun. 17, 2021, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of porous polymer and carbon membranes, and methods of gas separation by use of such membranes.

BACKGROUND OF THE INVENTION

Emission of carbon dioxide ($CO_2$) arising from the combustion of fossil fuels has raised widespread environmental concern. Cost-effective and scalable technologies are being sought for carbon capture from emission sources to reduce anthropogenic $CO_2$ emissions. Various carbon capture technologies, such as physical adsorption, chemical absorption, and membrane separation, have been widely investigated. Compared with other modes, membrane gas separation provides many inherent advantages, such as high energy efficiency, low capital investments, operational simplicity and flexibility to scale up, and is considered a very promising technology (e.g., N. Du et al., *Energy Environ. Sci.*, 5, 7306-7322, 2012).

Membrane separation relies on the difference in permeation rates of different gases traversing the membrane. Unfortunately, although polymeric membranes have been successfully commercialized since the 1980s, the separation performance is limited by an undesirable trade-off relationship between permeability (P) and selectivity (a). Thus, the separation performance is constrained by an upper limit, which has been illustrated empirically by Robeson (L. M. Robeson, *J. Membr. Sci.*, 320, 390-400, 2008) and theoretically by Freeman (B. D. Freeman, *Macromolecules*, 32, 375-380, 1999). Ongoing research efforts have been directed to the design and preparation of nanoporous polymeric materials to overcome this limit by, for example, using thermally rearranged (TR) polymers, polymers of intrinsic microporosity (PIMs), and mixed-matrix membranes (MMM). However, such efforts have resulted in limited improvements in separation performance.

Highly selective carbon dioxide separation from flue gas or other sources is a particularly challenging task. Chemical absorption methods that utilize, for example, ethanolamine for $CO_2$ capture, require large amounts of energy to regenerate the adsorbent and release the $CO_2$ gas. The development of a gas separation membrane that could efficiently separate carbon dioxide from other gases with substantial permeability and selectivity would be a significant advance in the field of gas separation technology.

SUMMARY OF THE INVENTION

In one aspect, the present disclosure is directed to crosslinked polymer membranes that exhibit exceptional gas permeabilities and selectivities for separating gases, such as separating $CO_2$ from other gas molecules, such as $N_2$ and $O_2$. Hence, these polymer membranes have excellent potential for large-scale gas separations of commercial and environmental relevance. Aside from containing a multiplicity of crosslinked aromatic rings, the polymer membranes described herein are fluorinated and microporous. The micropores have a pore size of up to 2 nm, and may include ultramicropores having a size of less than 1 nm, or 0.1 nm to 1 nm, or no more than or less than 0.5 nm.

More particularly, the crosslinked polymer is constructed of the following components: (i) an aromatic polymer containing a multiplicity of benzene rings; (ii) a multiplicity of fluorinated aromatic moieties; and (iii) a multiplicity of methylene ($—CH_2—$) linkages; wherein, throughout the microporous membrane, at least two methylene linkages are attached to each fluorinated aromatic moiety, and each methylene linkage functions to connect the fluorinated aromatic moiety and a benzene ring on the aromatic polymer, thereby connecting each fluorinated aromatic moiety with at least two different benzene rings of the aromatic polymer.

More particularly, the crosslinked polymer is constructed of the following components: (i) an aromatic polymer containing a multiplicity of benzene rings; (ii) a multiplicity of fluorinated aromatic moieties, wherein each fluorinated aromatic moiety contains at least two separate methylene ($—CH_2—$) linkages connected to benzene rings on the aromatic polymer. Throughout this disclosure, the structures of fluorinated aromatic moieties are depicted with methylene linkages as part of the fluorinated aromatic moieties.

In another aspect, the present disclosure is directed to a method of producing the above described crosslinked polymer and membranes composed thereof. In the method, an aromatic polymer is reacted with a fluorinated aromatic molecule containing benzyl alcohol groups under conditions (e.g., in presence of a superacid) in which hydrogen atoms on aromatic rings of the aromatic polymer undergo dehydration with hydroxy groups of the fluorinated aromatic molecule via a dehydrative Friedel-Crafts reaction, thereby resulting in methylene linkages connecting the fluorinated aromatic moiety and aromatic rings (e.g., benzene rings) on the aromatic polymer. By this process, each fluorinated aromatic moiety is connected with at least two different aromatic rings of the aromatic polymer. To produce a membrane, a non-porous aromatic polymer membrane may be immersed in a mixture of the fluorinated aromatic molecule and superacid at an elevated temperature (e.g., at least 80° C.) to promote crosslinking via the dehydrative Friedel-Crafts reaction. The resulting crosslinked and fluorinated membrane may be washed with water and/or organic solvent, followed by drying. Notably, the reaction process converts the non-porous polymer membrane into a highly porous (i.e., microporous) crosslinked membrane.

In another aspect, the present disclosure is directed to a method of at least partially separating carbon dioxide gas from a carbon dioxide-containing mixture of gases by use of the above described crosslinked polymer and membranes composed thereof. In the method, a mixture of gases is passed through the crosslinked polymer, with the result that one or more gases pass through and exit the membrane, while one or more gases are hindered or prevented from passing through and exiting the membrane. The selective passage or retainment of the gases can be attributed to differences in physisorption and pore size distribution. In particular embodiments, the method includes passing a carbon dioxide-containing mixture of gases (such as from flue gas) through the crosslinked polymer membrane, wherein gas exiting the membrane has an increased carbon dioxide concentration relative to the original (starting) carbon dioxide-containing mixture of gases.

In another aspect, the present disclosure is directed to a microporous carbon material containing elemental carbon doped with fluorine and oxygen atoms. The microporous carbon membrane typically has a fluorine content of at least or above 20 wt %. The microporous carbon material can be produced by carbonization (e.g., at 400-600° C.) of the crosslinked polymer described above. When the crosslinked polymer membrane described above is carbonized, a microporous carbon membrane doped with fluorine and oxygen atoms results. The micropores in the microporous carbon material have a size up to 2 nm, or within a range of 0.1 nm to 2 nm or within a sub-range thereof, and typically at least a portion thereof are ultra-micropores having a size of less than 1 nm, or within a range of 0.1 nm to 1 nm or below 0.5 nm. The microporous carbon membrane typically has a thickness of no more than 100 microns.

In yet another aspect, the present disclosure is directed to a method of at least partially separating one gas from a mixture of gases by use of the above described microporous carbon material and membranes composed thereof. In the method, a mixture of gases is passed through the microporous carbon membrane, with the result that one or more gases pass through and exit the membrane, while one or more gases are hindered or prevented from passing through and exiting the membrane. The selective passage or retainment of the gases can be attributed to differences in physisorption and pore size distribution. More particularly, the present disclosure is directed to a method of at least partially separating carbon dioxide gas from a carbon dioxide-containing mixture of gases by use of the above described microporous carbon material and membranes composed thereof. In particular embodiments, the method includes passing a carbon dioxide-containing mixture of gases (such as from flue gas) through the microporous carbon membrane, wherein gas exiting the membrane has an increased carbon dioxide concentration relative to the original (starting) carbon dioxide-containing mixture of gases.

BRIEF DESCRIPTION OF THE DRAWINGS

The patent or application file contains at least three drawings executed in color. Copies of this patent or patent application publication with color drawing(s) will be provided by the Office upon request and payment of the necessary fee.

FIG. 2A are photographs of $M_{PS}$ (starting polymer) and F-$M_{PS}$-1 (fluorinated crosslinked polymer obtained with F—OH-1 crosslinker) obtained with different reaction time as shown on the images. FIG. 2B shows chemical structure units of $M_{PS}$ precursor, F-$M_{PS}$-1, and F-$M_{PS}$-2 obtained after cross-linking with F—OH-1 and F—OH-2, respectively. FIG. 2C shows FT-IR spectra of $M_{PS}$, F-$M_{PS}$-1, and F-$M_{PS}$-2. FIG. 2D shows solid state $^{13}$C NMR spectra of F-$M_{PS}$-1 and F-$M_{PS}$-2, and liquid $^{13}$C NMR (CDCl$_3$, 100.6 MHz) of $M_{PS}$. FIG. 2E shows solid state $^{19}$F NMR spectra of F-$M_{PS}$-1 and F-$M_{PS}$-2. FIGS. 2F and 2G show XPS spectra (C1s, F1s and O1s) of F-$M_{PS}$-1 and F-$M_{PS}$-2, respectively. FIG. 2H shows TGA results of $M_{PS}$, F-$M_{PS}$-1, and F-$M_{PS}$-2 from 25° C. to 800° C. with ramping rate of 10° C. min$^{-1}$ under air and nitrogen atmosphere, respectively.

FIG. 3A is a SEM image of the surface of $M_{PS}$, and FIG. 3B is the cross section. The inset picture in dashed green box is the magnification of the area labeled by the corresponding small dashed green box. FIG. 3C is a TEM image of $M_{PS}$ powder obtained after grinding. FIG. 3D is a SEM image of F-$M_{PS}$-1 on surface, and FIG. 3E is the cross section. The inset pictures in dashed red/blue box are the magnification of the area labeled by the corresponding small dashed red/blue box, respectively. FIG. 3F is a TEM image of F-$M_{PS}$-1 on surface. FIG. 3G shows merged and separated elemental maps (C, F, and O) of F-$M_{PS}$-1 on surface, and FIG. 3H is the cross section.

FIG. 4A shows $N_2$ adsorption and desorption isotherm curves of $M_{PS}$, F-$M_{PS}$-1, and F-$M_{PS}$-2 collected at 77 K. FIG. 4B shows corresponding pore size distribution curves obtained from the adsorption branches using NLDFT method, and FIG. 4C shows pore size distribution using the Horvath-Kawazoe method. FIG. 4D shows $CO_2$ (1 bar) uptake capacity at 273 and 298 K of F-$M_{PS}$-1 and F-$M_{PS}$-2. Numbers in the brackets are isosteric heats of adsorption ($Q_{st}$). FIG. 4E shows membrane separation performance of F-$M_{PS}$-1 and F-$M_{PS}$-2: plots of selectivity versus permeability for $CO_2/N_2$.

FIG. 5A shows $N_2$ adsorption and desorption isotherm curves at 77 K of F-$M_{PS}$-1-T (T=400, 500, 600, and 700° C.). FIG. 5D shows $N_2$ adsorption and desorption isotherm curves at 77 K of F-$M_{PS}$-2-T (T=500 and 600° C.). FIGS. 5B and 5E show corresponding pore size distribution curves of F-$M_{PS}$-1-T and F-$M_{PS}$-2-T obtained from the adsorption branches using Horvath-Kawazoe method, while FIGS. 5C and 5F show the pore size distribution results using the NLDFT method. FIG. 5G shows $CO_2$ (1 bar) uptake capacity (273 and 298 K) of F-$M_{PS}$-1-T and F-$M_{PS}$-2-T. Numbers in the brackets are isosteric heats of adsorption ($Q_{st}$). FIG. 5H shows membrane separation performance of F-$M_{PS}$-1-T and F-$M_{PS}$-2-T: plots of selectivity versus permeability for $CO_2/N_2$.

DETAILED DESCRIPTION OF THE INVENTION

Figure 1:
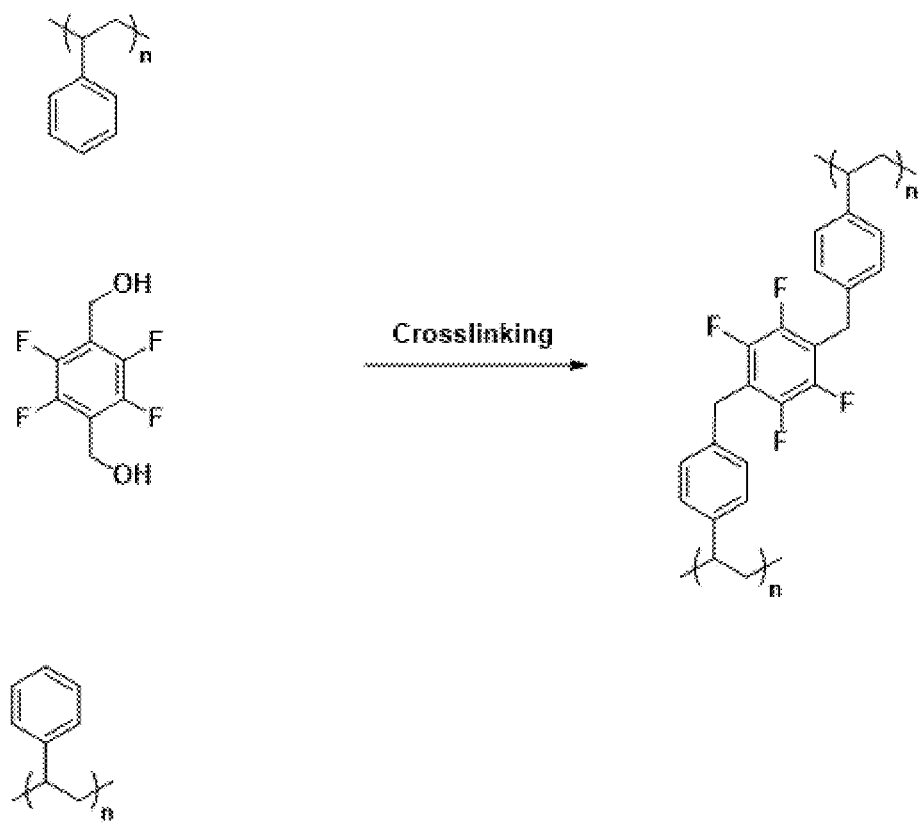
FIG. 1 is a general schematic of the dehydrative Friedel-Crafts process used for preparing fluorinated crosslinked polymer compositions.

In a first aspect, the present disclosure is directed to a crosslinked microporous membrane (CMM) (i.e., "crosslinked polymer") composition useful in gas separation and related applications. The CMM composition is at least partially fluorinated and contains (i) an aromatic polymer containing a multiplicity of benzene rings; (ii) a multiplicity of fluorinated aromatic moieties; and (iii) a multiplicity of methylene (—CH$_2$—) linkages linking between benzene rings of components (i) and fluorinated aromatic moieties of component (ii). The crosslinked polymer described above may alternatively be described as having the following components: (i) an aromatic polymer containing a multiplicity of benzene rings; and (ii) a multiplicity of fluorinated aromatic moieties, wherein each fluorinated aromatic moiety contains at least two separate methylene (—CH$_2$—) linkages connected to benzene rings on the aromatic polymer. Throughout this disclosure, the structures of fluorinated aromatic moieties are depicted with methylene linkages as part of the fluorinated aromatic moieties. The term "aromatic ring," as used herein, includes single, i.e., monocyclic, rings (e.g., benzene or pyridine ring), as well as two or more aromatic rings that are linked or fused to result in a fused or unfused bicyclic, tricyclic, tetracyclic, or higher cyclic ring system, as described in further detail below. In some embodiments, component (i) and/or (ii), or more specifically, benzene rings and/or fluorinated aromatic moieties, is substituted with one or more hydrocarbon groups (R) containing 1-12 carbon atoms. The term "membrane" refers to a substantially planar shape, such as a sheet or film.

In a first embodiment, the term "hydrocarbon group" (identified as R) is a group composed solely of carbon and hydrogen. In different embodiments, one or more of the hydrocarbon groups can independently contain, for example, one, two, three, four, five, six, seven, eight, nine, ten, eleven, or twelve carbon atoms, or a number of carbon atoms within a particular range bounded by any two of the foregoing carbon numbers. In other embodiments, the hydrocarbon group includes one or more fluorine atoms (i.e., may be partially or completely fluorinated) in addition to carbon and hydrogen. In the case where all hydrogen atoms are substituted with fluorine atoms, the hydrocarbon groups may be composed of only carbon and fluorine atoms. Generally, the hydrocarbon group does not contain heteroatoms, such as oxygen, nitrogen, or sulfur.

The hydrocarbon group (R) can be, for example, a saturated and straight-chained hydrocarbon group (i.e., straight-chained or linear alkyl group). Some examples of straight-chained alkyl groups include methyl, ethyl, n-propyl, n-butyl, n-pentyl, n-hexyl, n-heptyl, n-octyl, n-nonyl, n-decyl, n-undecyl, and n-dodecyl groups. Some examples of partially fluorinated versions of such groups include fluoromethyl, difluoromethyl, 2,2,2-trifluoroethyl, and 2,2,3,3,3-pentafluoropropyl groups. Some examples of fully fluorinated versions of such groups include trifluoromethyl, perfluoroethyl, perfluoropropyl, and perfluorobutyl groups.

The hydrocarbon group (R) can alternatively be a saturated and branched hydrocarbon group (i.e., branched alkyl group), which may or may not be fluorinated. Some examples of branched alkyl groups include isopropyl (2-propyl), isobutyl (2-methylprop-1-yl), sec-butyl (2-butyl), t-butyl, 2-pentyl, 3-pentyl, 2-methylbut-1-yl, isopentyl (3-methylbut-1-yl), 1,2-dimethylprop-1-yl, 1,1-dimethyl-prop-1-yl, neopentyl (2,2-dimethylprop-1-yl), 2-hexyl, 3-hexyl, 2-methylpent-1-yl, 3-methylpent-1-yl, and isohexyl (4-methylpent-1-yl), wherein the "1-yl" suffix represents the point of attachment of the group.

The hydrocarbon group (R) can alternatively be a saturated and cyclic hydrocarbon group (i.e., cycloalkyl group), which may or may not be fluorinated. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

The hydrocarbon group (R) can alternatively be an unsaturated and straight-chained hydrocarbon group (e.g., a straight-chained olefinic or alkenyl group), which may or may not be fluorinated. The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$=CH—$CH_2$—$CH_2$—), 2-buten-1-yl ($CH_2$—CH=CH—$CH_2$—), butadienyl, 4-penten-1-yl groups, 3-hexen-1-yl, 7-octen-1-yl, 9-decen-1-yl, and 9,11-dodecadienyl. An example of a straight-chained alkynyl group is a propargyl group.

The hydrocarbon group (R) can alternatively be an unsaturated and branched hydrocarbon group (e.g., branched olefinic or alkenyl group), which may or may not be fluorinated. Some examples of branched olefinic groups include propen-2-yl, 3-buten-2-yl ($CH_2$=CH—CH.—$CH_3$), 3-buten-3-yl ($CH_2$=C.—$CH_2$—$CH_3$), 4-penten-2-yl, 4-penten-3-yl, 3-penten-2-yl, 3-penten-3-yl, and 2,4-penta-dien-3-yl, wherein the dot in the foregoing exemplary formulas represents the point of attachment of the group.

The hydrocarbon group (R) can alternatively be an unsaturated cyclic hydrocarbon group, which may or may not be fluorinated. The unsaturated cyclic group can be aromatic or aliphatic. Some examples of unsaturated cyclic hydrocarbon groups include cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene.

Component (i) of the microporous membrane composition is an aromatic polymer containing a multiplicity of benzene rings. The multiplicity of benzene rings may be in the backbone or pendant positions of the aromatic polymer, or both. Some examples of polymers containing benzene rings in pendant positions include polystyrene (PS) and copolymers thereof, such as a copolymer with polybutadiene (e.g., PS-b-PB, wherein PB is polybutadiene). Some examples of polymers containing benzene rings in the backbone include poly(ether sulfone), poly(ether ketone), polyimide, polyphenyl ether, polycarbonate, poly(divinyl-benzene), poly(p-phenylene vinylene), and copolymers thereof. The copolymer may be a block, alternating, random, or periodic copolymer, and may be binary or ternary. In some embodiments, the aromatic polymer is non-fluorinated. In other embodiments, the aromatic polymer is partially fluorinated by retaining some hydrogen atoms on benzene rings of the aromatic polymer. For purposes of the present invention, the aromatic polymer is typically not fully fluorinated.

Component (ii) of the microporous membrane composition is a multiplicity of fluorinated aromatic moieties. The fluorinated aromatic moieties contain aromatic rings that are at least partially fluorinated. In some embodiments, the aromatic rings are precisely or at least 40, 50, 60, 70, or 80% fluorinated. In some embodiments, the aromatic rings are completely fluorinated (i.e., all available hydrogen atoms on the aromatic ring have been substituted with fluorine atoms). The term "aromatic ring", as used herein, includes carbocyclic aromatic rings (e.g., benzene) and heteroaromatic rings (e.g., pyridine, pyrazine, pyrimidine, imidazole, or pyrrole). A portion or all of the carbocyclic or heterocyclic monocyclic rings may also be linked or fused to result in one or more bicyclic, tricyclic, tetracyclic, higher cyclic, or fused ring systems. Some examples of carbocyclic aromatic rings and ring systems include phenyl (benzene), biphenyl, terphenyl (o-, m-, and p-isomers), quaterphenyl, 1,3,5-tri-phenylbenzene, quinquephenyl, naphthyl, anthracenyl, phenanthrenyl, pyrenyl, chrysenyl, and fluorenyl.

The fluorinated aromatic moiety typically contains at least 6 carbon atoms, and may contain up to, for example, 12, 24, 36, 48, 60, or 72 carbon atoms, or a number of carbon atoms within a range bounded by any two of the foregoing values (e.g., 6-72 carbon atoms). In one set of embodiments, at least a portion or all of the fluorinated aromatic moieties are bivalent (i.e., each fluorinated aromatic moiety crosslinks via two connecting positions). In another set of embodiments, at least a portion or all of the fluorinated aromatic moieties are trivalent (i.e., each fluorinated aromatic moiety crosslinks via three connecting positions). In another set of embodiments, at least a portion or all of the fluorinated aromatic moieties are tetravalent (i.e., each fluorinated aromatic moiety crosslinks via four connecting positions).

In some embodiments, at least a portion of the fluorinated aromatic moieties have the following bivalent structure:

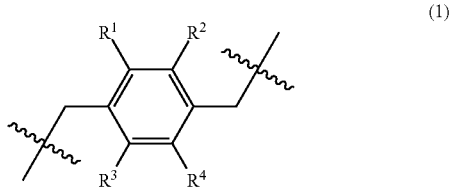

(1)

In Formula (1) above, $R^1$, $R^2$, $R^3$, and $R^4$ are independently selected from hydrogen atom (H), fluorine atom (F), and hydrocarbon groups (R) containing 1-12 carbon atoms and optionally substituted with one or more fluorine atoms. In some embodiments, one or two of $R^1$, $R^2$, $R^3$, and $R^4$ are alkyl groups or fluorinated alkyl groups. In other embodiments, one or two of $R^1$, $R^2$, $R^3$, and $R^4$ are hydrogen atoms. In Formula (1), $R^1$ and $R^2$ are optionally interconnected to form a ring, and/or $R^3$ and $R^4$ are optionally interconnected to form a ring, wherein the ring may be any hydrocarbon ring, typically containing five or six ring atoms. More typically, the ring formed by interconnection is a benzene ring. In particular embodiments, $R^1$ and $R^2$ interconnect to form a benzene ring, and/or $R^3$ and $R^4$ interconnect to form a benzene ring, in which case the moiety of Formula (1) may have two or three fused benzene rings.

For purposes of the invention, at least 50% of hydrogen atoms bound to aromatic rings in the structure of Formula (1) are substituted with fluorine atoms. In one set of embodiments, precisely or at least two, three, or all of $R^1$, $R^2$, $R^3$, and $R^4$ are fluorine atoms. In some embodiments, one or two of $R^1$, $R^2$, $R^3$, and $R^4$ are hydrogen atoms, with the remainder being fluorine atoms. In other embodiments, one or two of $R^1$, $R^2$, $R^3$, and $R^4$ are alkyl groups and/or fluorinated alkyl groups, with the remainder being fluorine atoms. In other embodiments, $R^1$ and $R^2$ are optionally interconnected to form an aromatic (e.g., benzene) ring, and/or $R^3$ and $R^4$ are optionally interconnected to form an aromatic (e.g., benzene) ring, and each ring, if present, contains at least 50% fluorine substitution.

In embodiments of Formula (1) in which $R^1$ and $R^2$ are interconnected to form an aromatic (e.g., benzene) ring, the fluorinated aromatic moiety may have the following structure:

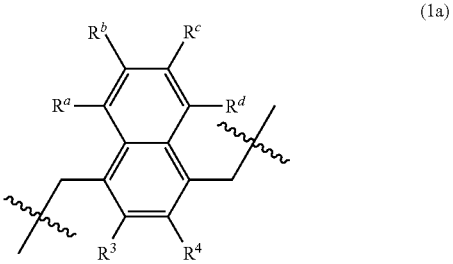

(1a)

In Formula (1a), $R^3$ and $R^4$ are as defined under Formula (1). The variables $R^a$, $R^b$, $R^c$, and $R^d$ are independently selected from the group consisting of hydrogen atom (H), fluorine atom (F), and hydrocarbon groups (R) containing one to twelve carbon atoms, optionally substituted with fluorine. Moreover, $R^a$ and $R^b$ are optionally interconnected to form a ring, and/or $R^b$ and $R^c$ are optionally interconnected to form a ring, and/or $R^c$ and $R^d$ are optionally interconnected to form a ring, wherein the ring is typically a benzene ring, and the ring is at least partially fluorinated. A ring formed by interconnection of groups is typically fluorinated, more typically by having at least 50% of its hydrogen atoms substituted with fluorine atoms. In some embodiments, one or both of $R^3$ and $R^4$ are fluorine atoms. In the case where only one of $R^3$ and $R^4$ is a fluorine atom, at least two, three, or all of $R^a$, $R^b$, $R^c$, and $R^d$ are fluorine atoms. In the case where both $R^3$ and $R^4$ are fluorine atoms, at least one, two, three, or all of $R^a$, $R^b$, $R^c$, and $R^d$ are fluorine atoms.

In embodiments of Formula (1) in which $R^1$ and $R^2$ are interconnected to form an aromatic (e.g., benzene) ring and $R^3$ and $R^4$ are also interconnected to form an aromatic (e.g., benzene) ring, the fluorinated aromatic moiety may have the following structure:

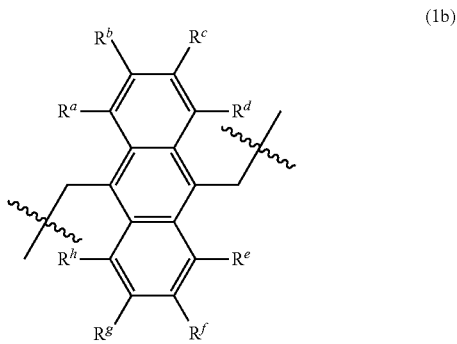

(1b)

In Formula (1b), $R^a$, $R^b$, $R^c$, and $R^d$ are as defined above under Formula (1a). Similarly, the variables $R^e$, $R^f$, $R^g$, and $R^h$ are independently selected from the group consisting of hydrogen atom (H), fluorine atom (F), and hydrocarbon groups (R) containing one to twelve carbon atoms, optionally substituted with fluorine. Moreover, $R^a$ and $R^b$ are optionally interconnected to form a ring, and/or $R^b$ and $R^c$ are optionally interconnected to form a ring, and/or $R^c$ and $R^d$ are optionally interconnected to form a ring, and/or $R^e$ and $R^f$ are optionally interconnected to form a ring, and/or $R^f$ and $R^g$ are optionally interconnected to form a ring, and/or $R^g$ and $R^h$ are optionally interconnected to form a ring, wherein the ring is typically a benzene ring, and the ring is at least partially fluorinated. A ring formed by interconnection of groups is typically fluorinated, more typically by having at least 50% of its hydrogen atoms substituted with fluorine atoms.

In other embodiments, at least a portion of the fluorinated aromatic moieties have the following bivalent structure:

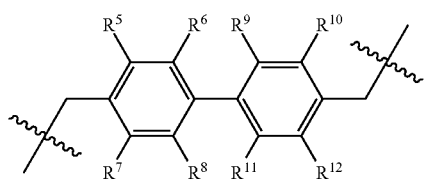

(2)

In Formula (2) above, $R^5$, $R^6$, $R^7$, $R^8$, $R^9$, $R^{10}$, $R^{11}$, and $R^{12}$ are independently selected from hydrogen atom (H), fluorine atom (F), and hydrocarbon groups (R) containing 1-12 carbon atoms and optionally substituted with one or more fluorine atoms. In some embodiments, one, two, three, or four of $R^5$, $R^6$, $R^7$, $R^8$, $R^9$, $R^{10}$, $R^{11}$, and $R^{12}$ are alkyl groups or fluorinated alkyl groups. In other embodiments, one, two, three, or four of $R^5$, $R^6$, $R^7$, $R^8$, $R^9$, $R^{10}$, $R^{11}$, and $R^{12}$ are hydrogen atoms. In Formula (2), $R^5$ and $R^6$ are optionally interconnected to form a ring, and/or $R^7$ and $R^8$ are optionally interconnected to form a ring; and/or $R^9$ and $R^{10}$ are optionally interconnected to form a ring; and/or $R^{11}$ and $R^{12}$ are optionally interconnected to form a ring, wherein the ring may be any hydrocarbon ring, typically containing five or six ring atoms. More typically, the ring formed by interconnection is a benzene ring. For example, $R^5$ and $R^6$ may interconnect to form a benzene ring and $R^{11}$ and $R^{12}$ may interconnect to form a benzene ring, in which case the moiety of Formula (2) has a 1,1'-dinaphthyl structure.

For purposes of the invention, at least 50% of hydrogen atoms bound to aromatic rings in the structure of Formula (2) are substituted with fluorine atoms. In one set of embodiments, precisely or at least four, five, six, seven, or all of $R^5$, $R^6$, $R^7$, $R^8$, $R^9$, $R^{10}$, $R^{11}$, and $R^{12}$ are fluorine atoms. In some embodiments, one, two, three, or four of $R^5$, $R^6$, $R^7$, $R^8$, $R^9$, $R^{10}$, $R^{11}$, and $R^{12}$ are hydrogen atoms, with the remainder being fluorine atoms. In other embodiments, one, two, three, or four of $R^5$, $R^6$, $R^7$, $R^8$, $R^9$, $R^{10}$, $R^{11}$, and $R^{12}$ are alkyl groups and/or fluorinated alkyl groups, with the remainder being fluorine atoms. In other embodiments, $R^5$ and $R^6$ are optionally interconnected to form an aromatic (e.g., benzene) ring, and/or $R^7$ and $R^8$ are optionally interconnected to form an aromatic (e.g., benzene) ring, and/or $R^9$ and $R^{10}$ are optionally interconnected to form an aromatic (e.g., benzene) ring, and/or $R^{11}$ and $R^{12}$ are optionally interconnected to form an aromatic (e.g., benzene) ring, and each ring, if present, contains at least 50% fluorine substitution.

In other embodiments, at least a portion of the fluorinated aromatic moieties have the following bivalent structure:

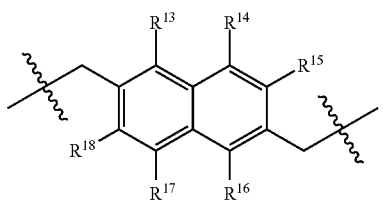

(3)

In Formula (3) above, $R^{13}$, $R^{14}$, $R^{15}$, $R^{16}$, $R^{17}$, and $R^{18}$ are independently selected from hydrogen atom (H), fluorine atom (F), and hydrocarbon groups (R) containing 1-12 carbon atoms and optionally substituted with one or more fluorine atoms. In some embodiments, one, two, or three of $R^{13}$, $R^{14}$, $R^{15}$, $R^{16}$, $R^{17}$, and $R^{18}$ are alkyl groups or fluorinated alkyl groups. In other embodiments, one, two, or three of $R^{13}$, $R^{14}$, $R^{15}$, $R^{16}$, $R^{17}$, and $R^{18}$ are hydrogen atoms. In Formula (3), $R^{13}$ and $R^{14}$ are optionally interconnected to form a ring, and/or $R^{14}$ and $R^{15}$ are optionally interconnected to form a ring; and/or $R^{16}$ and $R^{17}$ are optionally interconnected to form a ring; and/or $R^{17}$ and $R^{18}$ are optionally interconnected to form a ring, wherein the ring may be any hydrocarbon ring, typically containing five or six ring atoms. More typically, the ring formed by interconnection is a benzene ring. For example, $R^{14}$ and $R^{15}$ may interconnect to form a benzene ring, in which case the moiety of Formula (3) has a phenanthrene structure. As another example, $R^{14}$ and $R^5$ may interconnect to form a benzene ring and $R^{17}$ and $R^{18}$ may interconnect to form a benzene ring, in which case the moiety of Formula (3) has a chrysene structure. As another example, $R^{13}$ and $R^{14}$ may interconnect to form a benzene ring, in which case the moiety of Formula (3) has a phenalene structure. As another example, $R^{13}$ and $R^{14}$ may interconnect to form a benzene ring and $R^{14}$ and $R^{15}$ may interconnect to form a benzene ring, in which case the moiety of Formula (3) has a pyrene structure.

For purposes of the invention, at least 50% of hydrogen atoms bound to aromatic rings in the structure of Formula (3) are substituted with fluorine atoms. In one set of embodiments, precisely or at least three, four, five, or all of $R^{13}$, $R^{14}$, $R^{15}$, $R^{16}$, $R^{17}$, and $R^{18}$ are fluorine atoms. In some embodiments, one, two, or three of $R^{13}$, $R^{14}$, $R^{15}$, $R^{16}$, $R^{17}$, and $R^{18}$ are hydrogen atoms, with the remainder being fluorine atoms. In other embodiments, one, two, or three of $R^{13}$, $R^{14}$, $R^{15}$, $R^{16}$, $R^{17}$, and $R^{18}$ are alkyl groups and/or fluorinated alkyl groups, with the remainder being fluorine atoms. In other embodiments, $R^{13}$ and $R^{14}$ are optionally interconnected to form an aromatic (e.g., benzene) ring, and/or $R^{14}$ and $R^{15}$ are optionally interconnected to form an aromatic (e.g., benzene) ring, and/or $R^{16}$ and $R^{17}$ are optionally interconnected to form an aromatic (e.g., benzene) ring, and/or $R^{17}$ and $R^{18}$ are optionally interconnected to form an aromatic (e.g., benzene) ring, and each ring, if present, contains at least 50% fluorine substitution.

In other embodiments, at least a portion of the fluorinated aromatic moieties have the following bivalent structure:

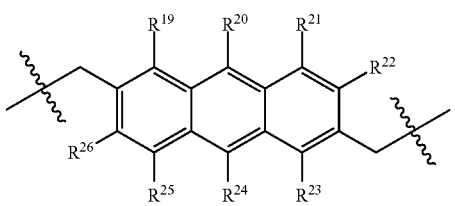

(4)

In Formula (4) above, $R^{19}$, $R^{20}$, $R^{21}$, $R^{22}$, $R^{23}$, $R^{24}$, $R^{25}$, and $R^{26}$ are independently selected from hydrogen atom (H), fluorine atom (F), and hydrocarbon groups (R) containing 1-12 carbon atoms and optionally substituted with one or more fluorine atoms. In some embodiments, one, two, three, or four of $R^{19}$, $R^{20}$, $R^{21}$, $R^{22}$, $R^{23}$, $R^{24}$, $R^{25}$, and $R^{26}$ are alkyl groups or fluorinated alkyl groups. In other embodiments, one, two, three, or four of $R^{19}$, $R^{20}$, $R^{21}$, $R^{22}$, $R^{23}$, $R^{24}$, $R^{25}$, and $R^{26}$ are hydrogen atoms. In Formula (4), $R^{19}$ and $R^{20}$ are optionally interconnected to form a ring, and/or $R^{20}$ and $R^{21}$ are optionally interconnected to form a ring; and/or $R^{21}$ and $R^{22}$ are optionally interconnected to form a ring; and/or $R^{23}$ and $R^{24}$ are optionally interconnected to form a ring; and/or $R^{24}$ and $R^{25}$ are optionally interconnected to form a ring; and/or $R^{25}$ and $R^{26}$ are optionally interconnected to form a ring, wherein the ring may be any hydrocarbon ring, typically containing five or six ring atoms. More typically, the ring formed by interconnection is a benzene ring.

For purposes of the invention, at least 50% of hydrogen atoms bound to aromatic rings in the structure of Formula (4) are substituted with fluorine atoms. In one set of embodiments, precisely or at least four, five, six, seven, or all of $R^{19}$, $R^{20}$, $R^{21}$, $R^{22}$, $R^{23}$, $R^{24}$, $R^{25}$, and $R^{26}$ are fluorine atoms. In some embodiments, one, two, three, or four of $R^{19}$, $R^{20}$, $R^{21}$, $R^{22}$, $R^{23}$, $R^{24}$, $R^{25}$, and $R^{26}$ are hydrogen atoms, with the remainder being fluorine atoms. In other embodiments, one, two, three, or four of $R^{19}$, $R^{20}$, $R^{21}$, $R^{22}$, $R^{23}$, $R^{24}$, $R^{25}$, and $R^{26}$ are alkyl groups and/or fluorinated alkyl groups, with the remainder being fluorine atoms. In other embodiments, $R^{19}$ and $R^{20}$ are optionally interconnected to form an aromatic (e.g., benzene) ring, and/or $R^{20}$ and $R^{21}$ are optionally interconnected to form an aromatic (e.g., benzene) ring, and/or $R^{21}$ and $R^{22}$ are optionally interconnected to form an aromatic (e.g., benzene) ring, and/or $R^{23}$ and $R^{24}$ are optionally interconnected to form an aromatic (e.g., benzene) ring, and/or $R^{24}$ and $R^{25}$ are optionally interconnected to form an aromatic (e.g., benzene) ring, and/or $R^{25}$ and $R^{26}$ are optionally interconnected to form an aromatic (e.g., benzene) ring, and each ring, if present, contains at least 50% fluorine substitution.

In other embodiments, at least a portion of the fluorinated aromatic moieties have the following trivalent structure:

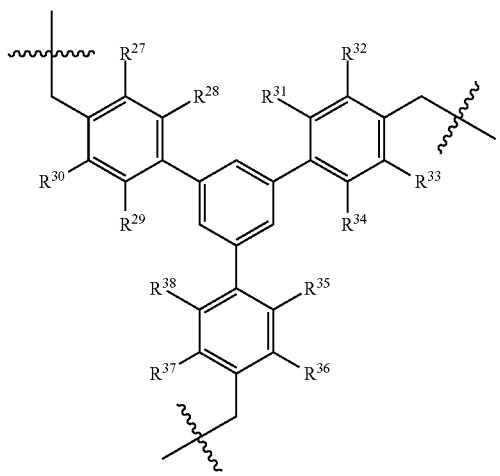

(5)

In Formula (5) above, $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are independently selected from hydrogen atom (H), fluorine atom (F), and hydrocarbon groups (R) containing 1-12 carbon atoms and optionally substituted with one or more fluorine atoms. In some embodiments, one, two, three, four, five, or six of $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are alkyl groups or fluorinated alkyl groups. In other embodiments, one, two, three, four, five, or six of $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are hydrogen atoms. In Formula (5), $R^{27}$ and $R^{28}$ are optionally interconnected to form a ring; and/or $R^{29}$ and $R^{30}$ are optionally intercon- nected to form a ring; and/or $R^{31}$ and $R^{32}$ are optionally interconnected to form a ring; and/or $R^{33}$ and $R^{34}$ are optionally interconnected to form a ring; and/or $R^{35}$ and $R^{36}$ are optionally interconnected to form a ring; and/or $R^{37}$ and $R^{38}$ are optionally interconnected to form a ring, wherein the ring may be any hydrocarbon ring, typically containing five or six ring atoms. More typically, the ring formed by interconnection is a benzene ring.

For purposes of the invention, at least 50% of hydrogen atoms bound to aromatic rings in the structure of Formula (5) are substituted with fluorine atoms. In one set of embodiments, precisely or at least six, seven, eight, nine, ten, eleven, or all of $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are fluorine atoms. In some embodiments, one, two, three, four, five, or six of $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are hydrogen atoms, with the remainder being fluorine atoms. In other embodiments, one, two, three, four, five, or six of $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are alkyl groups and/or fluorinated alkyl groups, with the remainder being fluorine atoms. In other embodiments, $R^{27}$ and $R^{28}$ are optionally interconnected to form an aromatic (e.g., benzene) ring, and/or $R^{29}$ and $R^{30}$ are optionally interconnected to form an aromatic (e.g., benzene) ring, and/or $R^{31}$ and $R^{32}$ are optionally interconnected to form an aromatic (e.g., benzene) ring, and/or $R^{33}$ and $R^{34}$ are optionally interconnected to form an aromatic (e.g., benzene) ring, and/or $R^{35}$ and $R^{36}$ are optionally interconnected to form an aromatic (e.g., benzene) ring, and/or $R^{37}$ and $R^{38}$ are optionally interconnected to form an aromatic (e.g., benzene) ring, and each ring, if present, contains at least 50% fluorine substitution.

In other embodiments, at least a portion of the fluorinated aromatic moieties have the following trivalent structure:

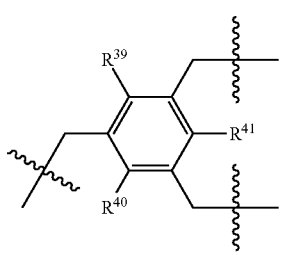

(6)

In Formula (6) above, $R^{39}$, $R^{40}$, and $R^{41}$ are independently selected from hydrogen atom (H), fluorine atom (F), and hydrocarbon groups (R) containing 1-12 carbon atoms and optionally substituted with one or more fluorine atoms. In some embodiments, one of $R^{39}$, $R^{40}$, and $R^{41}$ is an alkyl group or fluorinated alkyl group. In other embodiments, one of $R^{39}$, $R^{40}$, and $R^{41}$ is a hydrogen atom. For purposes of the invention, at least 50% of hydrogen atoms bound to aromatic rings in the structure of Formula (6) are substituted with fluorine atoms. In one set of embodiments, two or three of $R^{39}$, $R^{40}$, and $R^{41}$ are fluorine atoms. In some embodiments, one of $R^{39}$, $R^{40}$, and $R^{41}$ is a hydrogen atom, with the remainder being fluorine atoms. In other embodiments, one of $R^{39}$, $R^{40}$, and $R^{41}$ is an alkyl group or fluorinated alkyl group, with the remainder being fluorine atoms.

In some embodiments, at least a portion of the fluorinated aromatic moieties have the following tetravalent structure:

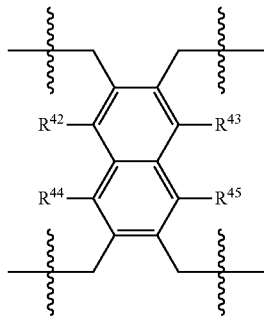

(7)

In Formula (7) above, $R^{42}$, $R^{43}$, $R^{44}$, and $R^{45}$ are independently selected from hydrogen atom (H), fluorine atom (F), and hydrocarbon groups (R) containing 1-12 carbon atoms and optionally substituted with one or more fluorine atoms. In some embodiments, one or two of $R^{42}$, $R^{43}$, $R^{44}$, and $R^{45}$ are alkyl groups or fluorinated alkyl groups. In other embodiments, one or two of $R^{42}$, $R^{43}$, $R^{44}$, and $R^{45}$ are hydrogen atoms. In Formula (7), $R^{42}$ and $R^{44}$ are optionally interconnected to form a ring, and/or $R^{43}$ and $R^{45}$ are optionally interconnected to form a ring, wherein the ring may be any hydrocarbon ring, typically containing five or six ring atoms. More typically, the ring formed by interconnection is a benzene ring. In particular embodiments, $R^{42}$ and $R^{44}$ interconnect to form a benzene ring, and/or $R^{43}$ and $R^{45}$ interconnect to form a benzene ring, in which case the moiety of Formula (7) may have three or four fused benzene rings.

For purposes of the invention, at least 50% of hydrogen atoms bound to aromatic rings in the structure of Formula (7) are substituted with fluorine atoms. In one set of embodiments, precisely or at least two, three, or all of $R^{42}$, $R^{43}$, $R^{44}$, and $R^{45}$ are fluorine atoms. In some embodiments, one or two of $R^{42}$, $R^{43}$, $R^{44}$, and $R^{45}$ are hydrogen atoms, with the remainder being fluorine atoms. In other embodiments, one or two of $R^{42}$, $R^{43}$, $R^{44}$, and $R^{45}$ are alkyl groups and/or fluorinated alkyl groups, with the remainder being fluorine atoms. In other embodiments, $R^{42}$ and $R^{44}$ are optionally interconnected to form an aromatic (e.g., benzene) ring, and/or $R^{43}$ and $R^{45}$ are optionally interconnected to form an aromatic (e.g., benzene) ring, and each ring, if present, contains at least 50% fluorine substitution.

In some embodiments, at least a portion of the fluorinated aromatic moieties have the following tetravalent structure:

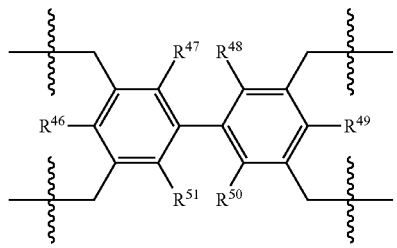

(8)

In Formula (8) above, $R^{46}$, $R^{47}$, $R^{48}$, $R^{49}$, $R^{50}$, and $R^{51}$ are independently selected from hydrogen atom (H), fluorine atom (F), and hydrocarbon groups (R) containing 1-12 carbon atoms and optionally substituted with one or more fluorine atoms. In some embodiments, one, two, or three of $R^{46}$, $R^{47}$, $R^{48}$, $R^{49}$, $R^{50}$, and $R^{51}$ are alkyl groups or fluorinated alkyl groups. In other embodiments, one, two, or three of $R^{46}$, $R^{47}$, $R^{48}$, $R^{49}$, $R^{50}$, and $R^{51}$ are hydrogen atoms. In Formula (8), $R^{47}$ and $R^{48}$ are optionally interconnected to form a ring, and/or $R^{50}$ and $R^{51}$ are optionally interconnected to form a ring, wherein the ring may be any hydrocarbon ring, typically containing five or six ring atoms. More typically, the ring formed by interconnection is a benzene ring. In particular embodiments, $R^{47}$ and $R^{48}$ interconnect to form a benzene ring, and/or $R^{50}$ and $R^{51}$ interconnect to form a benzene ring, in which case the moiety of Formula (8) may have three or four fused benzene rings.

For purposes of the invention, at least 50% of hydrogen atoms bound to aromatic rings in the structure of Formula (8) are substituted with fluorine atoms. In one set of embodiments, precisely or at least three, four, five, or all of $R^{42}$, $R^{43}$, $R^{44}$, and $R^{45}$ are fluorine atoms. In some embodiments, one, two, or three of $R^{42}$, $R^{43}$, $R^{44}$, and $R^{45}$ are hydrogen atoms, with the remainder being fluorine atoms. In other embodiments, one, two, or three of $R^{42}$, $R^{43}$, $R^{44}$, and $R^{45}$ are alkyl groups and/or fluorinated alkyl groups, with the remainder being fluorine atoms. In other embodiments, $R^{47}$ and $R^{48}$ are optionally interconnected to form an aromatic (e.g., benzene) ring, and/or $R^{50}$ and $R^{51}$ are optionally interconnected to form an aromatic (e.g., benzene) ring, and each ring, if present, contains at least 50% fluorine substitution.

Each of the methylene ($—CH_2—$) linkages shown in each of the fluorinated aromatic moieties above is connected to a benzene ring of the aromatic polymer. Generally, different methylene linkages in the same fluorinated aromatic moiety are connected to different benzene rings in the aromatic polymer. Thus, each fluorinated aromatic moiety is connected with at least two different benzene rings of the aromatic polymer, via the methylene linkages present in each fluorinated aromatic moiety.

The crosslinked microporous membrane (CMM) possesses micropores having a size of up to or less than 2 nm. In different embodiments, the micropores have a size of precisely, about, up to, or less than, for example, 0.1, 0.2, 0.3, 0.4, 0.5, 0.6, 0.7, 0.8, 0.9, 1.0, 1.2, 1.5, 1.8, or 2 nm, or a pore size, or a distribution of pore sizes, within a range bounded by any two of these values (e.g., 0.1-2 nm, 0.2-2 nm, 0.5-2 nm, 0.1-1.8 nm, 0.2-1.8 nm, 0.5-1.8 nm, 0.1-1.5 nm, 0.2-1.5 nm, 0.5-1.5 nm, 0.1-1 nm, 0.2-1 nm, 0.5-1 nm, 0.1-0.8 nm, 0.2-0.8 nm, or 0.5-0.8 nm). In some embodiments, the CMM possesses ultramicropores, which correspond to pore sizes up to or less than 1 nm, 0.8 nm, or 0.5 nm, e.g., a pore size in a range of 0.1-1 nm, 0.2-1 nm, 0.5-1 nm, 0.1-0.8 nm, 0.2-0.8 nm, or 0.5-0.8 nm. As used herein, the term "about" generally indicates within ±0.5%, 1%, 2%, 5%, or up to ±10% of the indicated value. For example, a pore size of "about 1 nm" generally indicates in its broadest sense 1 nm±10%, which indicates 0.9-1.1 nm. Alternatively, the term "about" can indicate a variation or average in a physical characteristic of a group, e.g., a population of pores. In some embodiments, the CMM excludes pores having a size outside of any of the exemplary pore size ranges provided above.

The CMM typically has a thickness of no more than 100, 150, or 200 microns. In different embodiments, the CMM has a thickness of no more than or less than 100, 90, 80, 70, 60, 50, 40, 30, 20, 10, or 1 micron, or a thickness within a range bounded by any two of the foregoing values, e.g., 1-200 microns, 1-150 microns, 1-100 microns, 10-100 microns, or 20-100 microns. The CMM typically has a fluorine content of at least 20 or 25 wt %, and may, in some embodiments, have a fluorine content of up to, 30, 35, or 40 wt %, or a fluorine content within a range therein (e.g., 20-40 wt %, 25-40 wt %, 20-35 wt %, 25-35 wt %, 20-30 wt %, or 25-30 wt %).

In another aspect, the present disclosure is directed to methods for producing the crosslinked polymer and membranes composed thereof. In particular embodiments, fluorinated benzyl alcohol molecules (crosslinkers) are crosslinked with benzene rings of an aromatic polymer under conditions promoting a dehydrative Friedel-Crafts reaction. The dehydrative Friedel-Crafts reaction is well known in the art, such as described in V. D. Vukovic et al., *Angew. Chem. Int. Ed.*, 56, 3085-3089, 2017, the contents of which are herein incorporated by reference. In the dehydrative Friedel-Crafts reaction, the benzyl alcohol molecule and aromatic polymer are mixed with a strong Bronsted acid or superacid, such as triflic acid, fluorosulfonic acid, or antimonic acid. To produce a crosslinked membrane, a precursor membrane composed of the aromatic polymer (e.g., polystyrene or copolymer thereof) may be immersed in a mixture of the benzyl alcohol crosslinker and acid, wherein the acid may, in some embodiments, also function as a solvent. Once immersed, the reaction mixture in contact with the precursor membrane is typically heated to a temperature of, for example, 50, 60, 70, 80, 90 or 100° C., or a temperature within a range bounded by any two of the foregoing temperatures (e.g., 80-100° C.) for a reaction time of 3, 6, 9, 12, 15, 18, 21, 24, 27, 30, 33, 36, 39, 42, 45, or 48 hours, depending on the temperature used.

In another aspect, the present disclosure is directed to a microporous carbon material produced by pyrolysis (carbonization) of the crosslinked membrane described above. Pyrolysis of a crosslinked membrane results in a microporous carbon membrane. The pyrolysis temperature may be, for example, 400° C., 450° C., 500° C., 550° C., 600° C., 650° C., 700° C., 750° C., or 800° C., or a temperature within a range bounded by any two of the foregoing temperatures. The pyrolysis may be conducted under an oxygen-containing (i.e., ambient air or reduced oxygen, e.g., no more than or less than 5% or 1% or 1000 ppm oxygen) or fully inert atmosphere (e.g., nitrogen and/or argon). The microporous carbon material is composed of elemental carbon doped with oxygen and fluorine atoms. In some embodiments, doping with nitrogen atoms is excluded. The fluorine content of the microporous carbon material may vary from 0-30 wt %, e.g., typically at least 1, 2, or 5 wt % and up to 8, 10, 12, or 15 wt %. The microporous carbon material may also have any of the fluorine contents provided above for the crosslinked membrane. The oxygen atoms may be incorporated in the carbon material in the form of one or more types of oxygen-containing groups, such as hydroxy, carbonyl, ether, ester, and/or carboxylic acid groups. The micropores in the microporous carbon material may have any of the pore sizes or pore size ranges provided above for the crosslinked membrane. The microporous carbon material typically includes ultramicropores, as described above for the crosslinked membrane. When used for gas separation, the microporous carbon material is typically in the shape of a membrane, and may have any of the thicknesses provided above for the crosslinked membrane.

In some embodiments, the crosslinked membrane or microporous carbon membrane further includes mesopores having a pore size of at least or above 2 nm and up to or less than 50 nm. In different embodiments, the mesopores have a pore size of precisely, about, up to, or less than, for example, 2.2 nm, 2.5 nm, 3 nm, 4 nm, 5 nm, 6 nm, 7 nm, 8 nm, 9 nm, 10 nm, 11 nm, 12 nm, 15 nm, 20 nm, 25 nm, 30 nm, 35 nm, 40 nm, or 45 nm, or a particular pore size, or a distribution of pore sizes, within a range bounded by any two of the foregoing exemplary values or between 2 nm and any of the foregoing exemplary values (e.g., 2-50 nm, 2.2-50 nm, 2.5-50 nm, or 3-50 nm), or between one of the foregoing exemplary pore sizes and 50 nm, or between any of the micropore or ultramicropore sizes and a mesopore size (e.g., 0.1-5 nm, 0.5-5 nm, 0.1-3 nm, 0.5-3 nm, 0.1-2.5 nm, or 0.5-2.5 nm). In other embodiments, the crosslinked polymer or microporous carbon excludes a pore size greater than any of the mesopore sizes provided above (e.g., excludes pore sizes greater than 2 nm, 3 nm, 4 nm, or 5 nm). In some embodiments, the crosslinked polymer or microporous carbon excludes pores having a size outside of any one of the exemplary micropore or ultramicropore size ranges provided above or anywhere throughout this disclosure.

The pores in the crosslinked polymer or microporous carbon are generally circular or oval-shaped. For circular or substantially circular pores, the pore size refers to the diameter of the pore. For pores that are substantially unsymmetrical or irregularly shaped, the pore size generally refers to either the average of the pore dimensions for a particular pore or to the average or longest dimension of such pores averaged over a population of such pores.

In one set of embodiments, a single distribution of pores is present in the crosslinked polymer or microporous carbon. A distribution (or "mode") of pores is generally defined by a single pore size of maximum (peak) pore volume concentration. The peak pore volume is generally in the micropore size range. In some embodiments, the crosslinked polymer or microporous carbon possesses a bimodal, trimodal, or higher modal pore size distribution, which can be identified by the presence of, respectively, two, three, or a higher number of peak volume concentrations. In the case of a bimodal pore size distribution, the pore size distribution may be defined by a minimum pore size in the micropore size range and a maximum pore size also in the micropore size range or in the mesopore size range, with either two peak pore volumes in the micropore size range, or one peak pore volume in the micropore size range and another peak pore volume in the mesopore size range. In the case of a trimodal pore size distribution, the pore size distribution may be defined by two peak pore volumes in the micropore size range and one peak pore volume in the mesopore size range, or one peak pore volume in the micropore size range and two peak pore volumes in the mesopore size range.

Generally, for purposes of the present invention, the pore volume attributed to micropores in the crosslinked polymer or microporous carbon is greater than the pore volume attributed to mesopores or larger size pores. For example, in different embodiments, the percent pore volume attributed to micropores (or a sub-range within micropores, such as ultramicropores) may be at least or above 50%, 55%, 60%, 65%, 70%, 75%, 80%, 85%, 90%, 95%, 98%, or 99% pore volume (by total pore volume) wherein it is understood that the total pore volume corresponds to 100% pore volume. The percent pore volume attributed to mesopores (if present) in the crosslinked polymer or microporous carbon is generally less than 50%, more typically no more than or less than 45%, 40%, 30%, 25%, 20%, 15%, 10%, 5%, 2%, or 1% by total pore volume. Macropores (i.e., pores above 50 nm) are generally not present. In some embodiments, the crosslinked polymer or microporous carbon possesses a substantial absence of mesopores and macropores. By a "substantial absence" of mesopores or macropores is generally meant that no more than or less than 1%, 0.5%, or 0.1% of the total pore volume, or none of the pore volume, can be attributed to the presence of mesopores and/or macropores.

The pores of the crosslinked polymer or microporous carbon can also possess a level of uniformity, generally either in pore diameter, pore shape, and/or pore interspacing. In some embodiments, the pores may possess an average pore size corresponding to any of the pore sizes exemplified above, subject to a degree of variation of no more than, for example, ±10 nm, ±8 nm, 6, nm, ±5 nm, ±4 nm, 3 nm, 2 nm, 1 nm, or ±0.5 nm. In some embodiments, any one of the types of pores described above (e.g., the micropores or size range therein) are substantially uniform in size.

The crosslinked polymer or microporous carbon may possess a BET surface area of about or at least, for example, 50, 100, 200, 300, 400, 450, 500, 550, 600, 650, 700, 750, 800, 900, 1000, 1500, 1800, or 2000 m$^2$/g, or a surface area within a range bounded by any two of these values. The crosslinked polymer or microporous carbon may also possess a total pore volume of precisely, about, or at least, for example, 0.2 cm$^3$/g, 0.3 cm$^3$/g, 0.4 cm$^3$/g, 0.5 cm$^3$/g, 0.6 cm$^3$/g, 0.7 cm$^3$/g, 0.8 cm$^3$/g, 0.9 cm$^3$/g, 1.0 cm$^3$/g, 1.2 cm$^3$/g, 1.5 cm$^3$/g, 1.8 cm$^3$/g, 2 cm$^3$/g, 2.2 cm$^3$/g, 2.5 cm$^3$/g, 3.0 cm$^3$/g, 3.5 cm$^3$/g, 4.0 cm$^3$/g, 4.5 cm$^3$/g, or 5.0 cm$^3$/g, or a pore volume within a range bounded by any two of these values.

The crosslinked polymer or microporous carbon membrane may or may not also function as part of a layered composite material, wherein the crosslinked polymer or microporous carbon membrane either overlays, underlies, or is sandwiched between one or more layers of another material. In some embodiments, the one or more layers of another material provides greater structural integrity to the membrane. If used in gas or liquid separation, filtration, or purification, the one or more layers of another material necessarily include structural features (e.g., pores or slits) that permit the gas or liquid to flow through the membrane. The one or more layers of another material may be porous or non-porous, and can be composed of, for example, a metal (e.g., aluminum or chrome), ceramic (e.g., silica, alumina, or aluminosilicate), paper, plastic, graphite, metal oxide, metal sulfide, metal selenide, metal telluride, metal nitride, metal phosphide, or an organic, inorganic, or hybrid polymer, or combination thereof, depending on the particular application. In some embodiments, the membrane is monolithic (i.e., not disposed on or overlaid with a substrate).

In another aspect, the present disclosure is directed to a method of gas separation by passing a mixture of at least two gases through the crosslinked polymer or microporous carbon membrane described above. Since at least one gas in the mixture of gases is substantially or completely prevented from passing (i.e., traversing) through the membrane, the phrase "passing a mixture of at least two gases through the porous polymer membrane" includes the possibility that only one or more select gases of the gas mixture will actually pass through and exit the membrane while one or more select gases may substantially or absolutely not pass through and exit the membrane even though they may initially enter the membrane to some degree. The gas separation can be a partial or complete separation of gases. In any event, the end result is that gas exiting the crosslinked polymer or microporous carbon membrane will have an increased concentration of a gas (e.g., carbon dioxide) separated from the original gaseous mixture relative to the initial concentration of the gas (e.g., carbon dioxide) in the initial gaseous mixture before being passed through the membrane. In the case where only a partial separation has been achieved, the partially separated gases may be passed through the membrane one or more additional times to improve on the separation. Moreover, the separation process may be conducted at a higher or lower temperature than room temperature (ca. 25° C.) and/or at a higher or lower pressure than normal atmospheric pressure (ca. 1 atm) in an effort to improve the separation.

The gases being separated may be or include, for example, carbon dioxide and nitrogen, or carbon dioxide and methane, or carbon dioxide and oxygen, or carbon dioxide and water vapor, or nitrogen and oxygen, or nitrogen and hydrogen, or oxygen and hydrogen, or oxygen and hydrogen, or ammonia and oxygen, or ammonia and hydrogen, or hydrogen and helium, or methane and nitrogen, or methane and hydrogen, or a mixture of three or more of any of the foregoing or other gases (e.g., carbon dioxide, nitrogen, and water vapor and/or oxygen and/or methane). Any one of the aforesaid gases may alternatively be separated from a gaseous mixture containing more than two gases, such as air or gaseous emission from an industrial or combustion process.

In some embodiments, the gas separation process may be integrally connected with a gaseous output emanating from an industrial or chemical process. In other embodiments, one or more gases (e.g., oxygen, nitrogen, hydrogen, or carbon dioxide) may be selectively passed through the porous membrane from air or an industrial gaseous emission while one or more other gases from air or an industrial gaseous emission are substantially inhibited from passing through or do not pass through the porous membrane. In practice, the mixture of gases is typically transported into a chamber capped on one end by the membrane, which is typically clad in a metal (e.g., aluminum) or ceramic except for a space in which the membrane is exposed for the gaseous mixture to make contact. The chamber should be sealed to ensure that the gaseous mixture has no exit but through the membrane. In some embodiments, the gas mixture is pressurized to a pressure at or above 1 atm. In other embodiments, the gas mixture is at a pressure of less than 1 atm (e.g., 0.4-0.9 atm).

In particular embodiments, the method is directed to separation of carbon dioxide from a mixture of gases. Aside from carbon dioxide, the mixture of gases typically also includes a substantial proportion of nitrogen gas and some amount of water vapor. Although some degree of separation of carbon dioxide from air may be possible, the present disclosure is primarily concerned with separation of carbon dioxide from industrial or combustion emissions in which carbon dioxide is present in substantially higher concentrations, e.g., at least or above 1, 2, 3, 4, or 5 vol %, more typically 5-20 vol %, or more typically 5-14% in the case of flue gas.

In some embodiments, the gas separation process described above is integrated with a process that uses a gas being separated by the above described process. More particularly, the above described process may provide an in situ-generated separated gas for use in a process requiring the separated gas. Such an integrated process may be particularly advantageous in supplying a useful gas (e.g., oxygen or hydrogen) over time (i.e., as produced in situ), which dispenses with the need to house a large stock of the useful gas. A source of carbon dioxide produced by the instant process may be integrated with, for example, a process of making a food or beverage, a process for the production of liquid carbon dioxide or dry ice or a process in which liquid carbon dioxide or dry ice is used, or a process for bioconversion of carbon dioxide to fuel. A source of oxygen or oxygen-enriched air produced by the instant process may be integrated with, for example, a medical process, a welding process, a smelting process, or a chemical production process. A source of nitrogen or nitrogen-enriched air produced by the instant process may be integrated with, for example, a chemical production process (e.g., the production of ammonia by the Haber process), or a process requiring an inert gas to protect oxygen-sensitive compounds and materials, or a process for the production of liquid nitrogen or a process in which liquid nitrogen is used. A source of hydrogen produced by the instant process may be integrated with, for example, a process in which a fuel cell uses hydrogen as a reactant, a chemical production process (e.g., production of ammonia, hydrogenation, petroleum processing, production of syngas, or a reduction process), or a process for the production of liquid hydrogen or a process in which liquid hydrogen is used. A source of methane (natural gas) produced by the instant process may be integrated with, for example, a process that uses methane as fuel.

Using either the crosslinked polymer or microporous carbon membrane, a carbon dioxide to nitrogen ($CO_2/N_2$) selectivity of at least 10 is typically achieved. In some embodiments, a carbon dioxide to nitrogen selectivity of at least or greater than 8, 9, 10, 12, 15, 18, 20, 22, 25, 28, 30, 32, or 35 is achieved. Any of the foregoing selectivities may alternatively be achieved for carbon dioxide over methane, or carbon dioxide over oxygen, or carbon dioxide over water vapor, or nitrogen over oxygen, or nitrogen over hydrogen, or nitrogen over methane, or oxygen over hydrogen, or oxygen over hydrogen, or ammonia over oxygen, or ammonia over hydrogen, or hydrogen over helium, or methane over nitrogen, or methane over hydrogen. A high ideal gas (e.g., carbon dioxide) permeability may also be achieved, e.g., at least or greater than 300, 400, 500, 600, 700, 800, 900, 1000, 1100, 1200, 1300, 1400, 1500, 1600, 1700, 1800, 1900, 2000, 2100, 2200, 2300, 2400, 2500, 3000, 3500, 4000, 4500, 5000, 5500, 6000, 7000, 8000, 9000, 10,000, 15,000, or 20,000 barrer.

Examples have been set forth below for the purpose of illustration and to describe certain specific embodiments of the invention. However, the scope of this invention is not to be in any way limited by the examples set forth herein.

EXAMPLES

Overview

The technologies described herein provide a one-step in situ cross-linking strategy for the preparation of fluorinated molecular sieve membranes. FIG. 1 shows an exemplary schematic of the process using a particular aromatic polymer (polystyrene) and fluorinated dibenzyl alcohol. The process uses dense and non-porous polystyrene ($M_{PS}$) membrane as the precursor template. By employing a dehydrative Friedel-Crafts reaction with highly fluorinated benzylic alcohols, $M_{PS}$ membranes were cross-linked in situ upon exposure to strong Brønsted acid (e.g., trifluoromethanesulfonic acid), affording hyper cross-linked fluorinated microporous polymeric membranes. The structural properties of the membranes may be tuned by using different fluorinated benzylic alcohol cross-linkers, with a surface area up to 523 m² g⁻¹ and micropore distribution centered at 1.1~1.3 nm and ultra-micropores (~0.6 nm) being obtained, overall exhibiting good ideal $CO_2$ permeability of 797 barrer and $CO_2/N_2$ selectivity of 28.5. In addition, high fluorine content (up to 28.5 wt %) and thermal stability of the as-synthesized polymeric membranes make them suitable candidates to produce fluorinated carbon molecular sieve membranes by tuning the pyrolysis temperature, leading to improved textural properties, e.g., high surface areas (up to 1020 m² g⁻¹), abundant ultra-micropores (~0.4 nm) and fluorine functionalities decorated on the pore surface. Enhanced $CO_2$ separation performances with ideal $CO_2$ permeability and $CO_2/N_2$ selectivity of 1898 barrer, 35.6 (F-$M_{PS}$-1-500) and 18761 barrer, 13.3 (F-$M_{PS}$-2-500), exceeding the Robeson upper bound, were achieved. The general design and synthesis protocol described herein permits easy access to fluorinated polymeric carbon molecular sieve membranes, thus significantly expanding the currently limited library of $CO_2$-philic membranes for highly efficient $CO_2$ separation.

The following fluorinated benzylic alcohol cross-linkers (F—OH-1, F—OH-2, and F—OH-3) and aromatic polymer ($M_{BuPS}$) were studied:

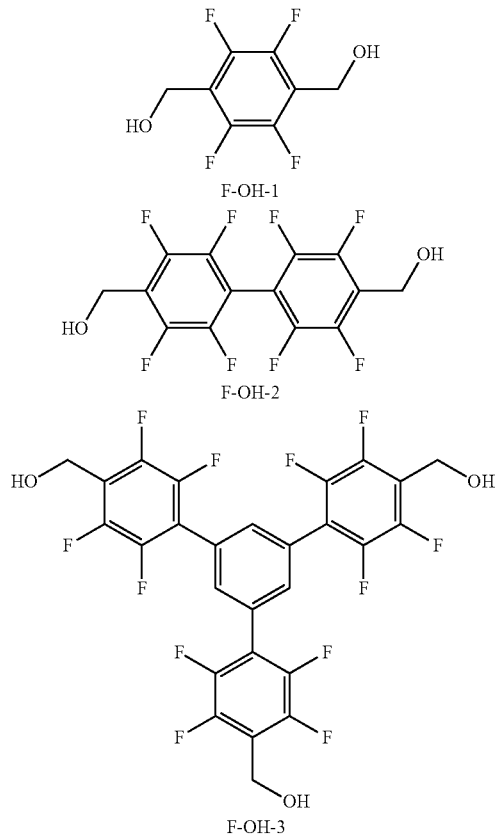

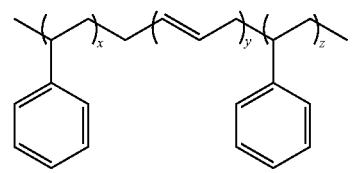

F—OH-1 was obtained from a commercial source, while F—OH-2 and F—OH-3 were synthesized according to previously reported literature and synthetic procedures shown below.

Synthesis of (perfluoro-[1,1'-biphenyl]-4,4'-diyl)dimethanol (F—OH-2)

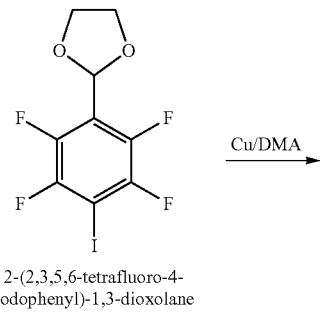

2-(2,3,5,6-tetrafluoro-4-iodophenyl)-1,3-dioxolane

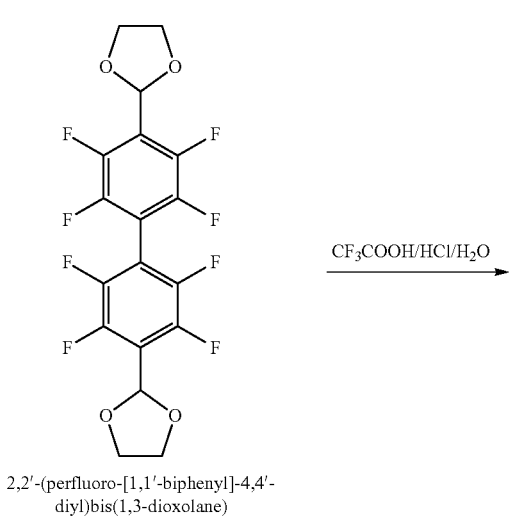

2,2'-(perfluoro-[1,1'-biphenyl]-4,4'-diyl)bis(1,3-dioxolane)

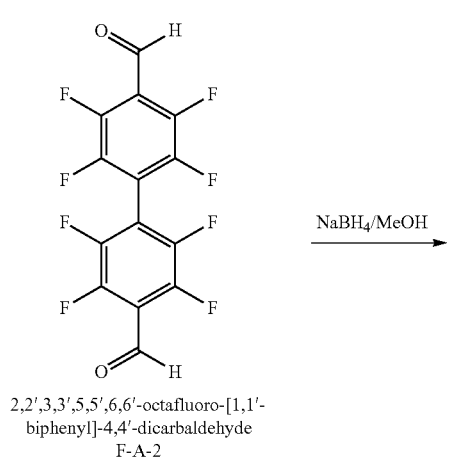

2,2',3,3',5,5',6,6'-octafluoro-[1,1'-biphenyl]-4,4'-dicarbaldehyde
F-A-2

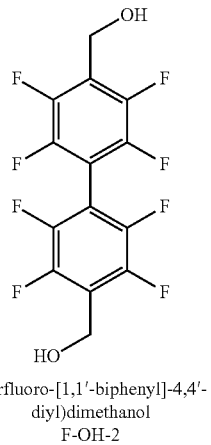

(perfluoro-[1,1'-biphenyl]-4,4'-diyl)dimethanol
F-OH-2

2-(2,3,5,6-tetrafluoro-4-iodophenyl)-1,3-dioxolane was prepared according to published methods.

A 250 mL Schlenk flask was charged with 2-(2,3,5,6-tetrafluoro-4-iodophenyl)-1,3-dioxolane (20.7 g, 59.4 mmol), copper powder (12.8 g, 200 mmol) and a magnetic stirring bar. The flask was evacuated and backfilled with argon 3 times. To this mixture anhydrous dimethylacetamide (DMA) (100 mL) was added through a cannula and the reaction mixture was placed in the oil bath heated at 150° C. The progress of the reaction was monitored by taking aliquots of the reaction mixture and subjecting them to thin layer chromatography on silica gel coated glass plates using $CH_2Cl_2$ as an eluent. After approximately 6 hours of heating, TLC indicated complete consumption of the starting material. Reaction mixture was allowed to cool to room temperature, diluted with $CH_2Cl_2$ and filtered through a plug of Celite to remove excess copper and copper iodide byproduct. Filtrate was extracted with water (5×200 mL), washed with brine (100 mL), and the organic layer was dried over anhydrous $MgSO_4$, filtered and evaporated to dryness. The solid residue was subjected to a column chromatography on silica gel, eluting with $CH_2Cl_2$/hexanes (gradient from 40% CH2Cl2 to 60% in hexanes). After evaporation the fraction containing the product the title material was isolated as a white solid (mass 11.7 g, 89% yield). $^1$H NMR ($CDCl_3$, 400 MHz) δ 4.07~4.13 (m, 4H), 4.21~4.27 (m, 4H), 6.31 (s, 2H); $^{19}$F NMR ($CDCl_3$, 376 MHz) δ −138.04~−138.14 (m, 4F), −143.17~−143.26 (m, 4F).

Trifluoroacetic acid (10 ml, excess) was placed in a conical flask. Compound 2,2'-(perfluoro-[1,1'-biphenyl]-4,4'-diyl)bis(1,3-dioxolane) (1.7692 g, 4 mmol) was added slowly giving a yellow mixture, followed by water (50 ml) and hydrochloric acid (10 ml, 37%). The mixture was stirred at 100° C. for 10 h. Then it was allowed to cool down to room temperature. The solvent was removed using rotary evaporator and the precipitate was collected by filtration and washed by diethyl ether. The product was obtained as white solid and the yield for this step was 95%. $^1$H NMR ($CDCl_3$, 400 MHz) δ 10.40 (s, 2H); $^{19}$F NMR ($CDCl_3$, 376 MHz) δ −143.40~−143.35 (m, 4F), −135.84~−135.78 (m, 4F).

A solution of F-A-2 (0.3542 g, 1 mmol) in MeOH (30 mL) was cooled to 0° C. in an ice bath and $NaBH_4$ (0.189 g, 5 mmol) was added portion-wise. Vigorous gas releasing was observed during the addition. The reaction was then stirred at room temperature overnight. MeOH was removed from reaction mixture under reduced pressure, the residue was separated by filtration and washed with water. The precipitate was collected and dried under vacuum at 60° C. to afford pure F—OH-2 as white solid in 93% yield. $^1$H NMR (CDCl$_3$, 400 MHz) δ 4.91 (d, 3J=6 Hz, 4H); 19F NMR (CDCl$_3$, 376 MHz) δ -143.63~-143.58 (m, 4F), -138.10~-138.03 (m, 4F); $^{13}$C NMR (d$_6$-DMSO, 100.6 MHz) δ 51.17, 122.47, 122.65, 122.83, 141.84, 141.99, 143.45, 144.33, 144.48, 145.88.

Synthesis of Tris(2,3,5,6-tetrafluoro-4-(hydroxymethyl)phenyl)benzene (F—OH-3)

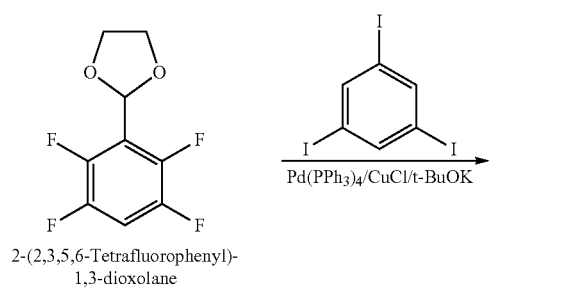

2-(2,3,5,6-Tetrafluorophenyl)-1,3-dioxolane

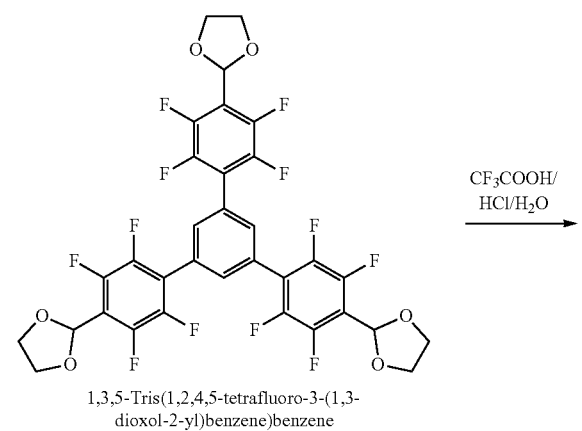

1,3,5-Tris(1,2,4,5-tetrafluoro-3-(1,3-dioxol-2-yl)benzene)benzene

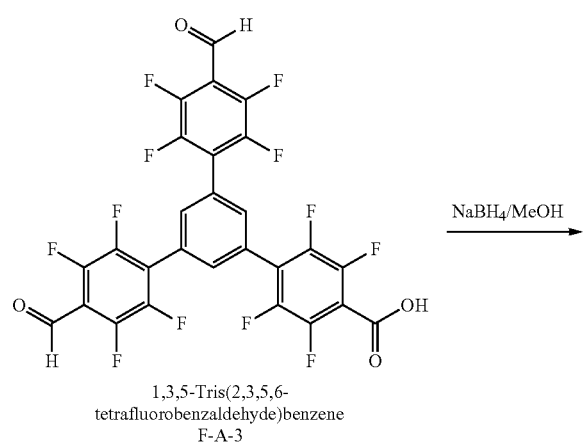

1,3,5-Tris(2,3,5,6-tetrafluorobenzaldehyde)benzene
F-A-3

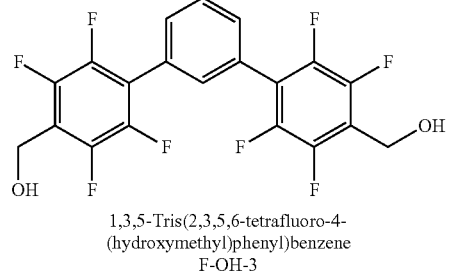

1,3,5-Tris(2,3,5,6-tetrafluoro-4-(hydroxymethyl)phenyl)benzene
F-OH-3

2-(2,3,5,6-Tetrafluorophenyl)-1,3-dioxolane was prepared according to published methods.

A 100-ml screw cap pressure vessel was equipped with magnetic stir bar and charged with CuCl (6.6 g, 66 mmol) and t-BuOK (7.28 g, 65 mmol). Dry N,N-dimethylformamide (DMF) (50 ml) was added. The reaction vessel was sealed, taken out of the glovebox, sonicated for 5 min and then vigorously stirred at 25° C. for 1 h. The pressure vessel was placed back inside the glovebox. 2-(2,3,5,6-Tetrafluorophenyl)-1,3-dioxolane (13.5 g, 60 mmol) was added in one portion, followed by the catalyst Pd(PPh$_3$)$_4$ (3.5 g, 3.00 mmol) and triiodobenzene (6.9 g, 15.1 mmol). Reaction mixture was sealed, taken out of the glovebox and then placed inside an oil bath preheated to 100° C., where it was stirred vigorously for 12 h. Reaction mixture was cooled to 25° C., diluted with CH$_2$Cl$_2$ (200 ml) and ammonium hydroxide (100 mL). Organic layer was separated and washed with deionized water (5×50 ml), followed by brine (50 ml). Finally, the organic layer was dried over anhydrous MgSO$_4$, filtered and dry-absorbed on silica gel. After purification by column chromatography on silica gel using ethyl acetate/hexanes (gradient from 10% to 100% ethyl acetate in hexanes) as eluent and evaporation of the fractions containing the product, title compound was obtained as a colorless solid (3.0 g, 48%). $^1$H NMR (400 MHz, CDCl$_3$) δ 4.07~4.13 (m, 6H), 4.21~4.27 (m, 6H), 6.31 (s, 3H), 7.68 (s, 3H); $^{19}$F NMR (376 MHz, CDCl$_3$) δ -143.86~-143.67 (m, 12F).

Trifluoroacetic acid (10 ml, excess) was placed in a conical flask. Compound 1,3,5-Tris(1,2,4,5-tetrafluoro-3-(1,3-dioxol-2-yl)benzene)benzene (2.954 g, 4 mmol) was added slowly giving a yellow mixture, followed by water (50 ml) and hydrochloric acid (10 ml, 37%). The mixture was stirred at 100° C. for 10 h. Then it was allowed to cool down to room temperature. The solvent was removed using rotary evaporator and the precipitate was collected by filtration and washed by diethyl ether. The product was obtained as white solid and the yield for this step was 90%. $^1$H NMR (CDCl$_3$, 400 MHz) δ 8.09 (s, 3H), 10.24 (s, 3H); $^{19}$F NMR (CDCl$_3$, 376 MHz) δ -145.89~-145.79 (m, 6F), -143.28~-143.18 (m, 6F).

A solution of F-A-3 (0.606 g, 1 mmol) in MeOH (30 mL) was cooled to 0° C. in an ice bath and NaBH$_4$ (0.378 g, 10 mmol) was added portion-wise. Vigorous gas releasing was observed during the addition. The reaction was then stirred at room temperature overnight. MeOH was removed from reaction mixture under reduced pressure, the residue was separated by filtration and washed with water. The precipitate was collected and dried under vacuum at 60° C. to afford pure F—OH-3 as white solid in 95% yield. $^1$H NMR ($d_6$-DMSO, 400 MHz) δ 4.64 (s, 6H), 5.66 (s, 3H), 7.92 (s, 3H); $^{19}$F NMR ($d_6$-DMSO, 376 MHz) δ −144.60~−144.35 (m, 8F); $^{13}$C NMR ($d_6$-DMSO, 100.6 MHz) δ 50.98, 117.68, 117.84, 118.00, 119.79, 119.96, 120.14, 127.95, 132.60, 141.78, 141.91, 141.97, 143.44, 143.60, 143.66, 144.27, 144.44, 145.86, 145.94, 146.09.

Fabrication of polystyrene (PS) membrane precursor: PS (Mw ca. 15,900) was dissolved in toluene to form 10 wt % polymer solutions. 2 mL of the solution was added in a glass petri dish with diameter of 6 cm, which was set aside on a flat surface. The solvent was allowed to evaporate at room temperature overnight, and then under vacuum at 50° C. for 2 h. Finally, PS membrane with thickness of 33 m was successfully fabricated, and then cast into small pieces with diameter of 12 mm for cross-linking. PS-block-polybutadiene-block-PS (PS-PB-PS) membrane precursor was fabricated with a similar procedure using PS-PB-PS (styrene 30 wt %, Mw ca. 140,000). The $Al_2O_3$-supported $M_{PS}$ membrane precursor was prepared by dropping 2 mL of the PS solution (10 wt % PS in toluene) on $Al_2O_3$ support (diameter: 6 cm), which was then dried under vacuum at 50° C. for 2 h after evaporating at room temperature overnight.

Fabrication of fluorinated polymeric molecular sieve membranes: Fluorinated benzylic alcohols F—OH-1, F—OH-2 or F—OH-3 (2 mmol) was completely dissolved in $CF_3SO_3H$ (10 mL). Six pieces of the as-prepared PS or PS-PB-PS membrane precursor was added to the mixture. The reaction system was sealed and heated to 100° C. in an oven for 24 h without stirring. The resulting membranes were taken out, washed with $H_2O$, THF and EtOH successively, and then dried in a vacuum oven at 60° C. for 24 h. For the fabrication of $Al_2O_3$-supported F-$M_{PS}$-1 membrane, the as-prepared $Al_2O_3$-supported $M_{PS}$ was used as the precursor, with F—OH-1 as the cross-linker, and the same procedure was adopted as that for F-$M_{PS}$-1.

Fabrication of fluorinated carbon molecular sieve membranes by pyrolysis: For the synthesis of fluorinated carbon molecular sieve membranes, during pyrolysis/carbonization, the polymer films were loaded between two pieces of carbon paper and sandwiched by quartz strips in order to keep the flat sheet morphology. In general, a piece of polymeric membrane precursor, F-$M_{PS}$-1 or F-$M_{PS}$-2, was placed in a tube furnace at certain temperature and maintained at this temperature for 12 h under a nitrogen gas flow (heating rate: 10° C. min$^{-1}$).

Results and Discussion

Figure 2A:
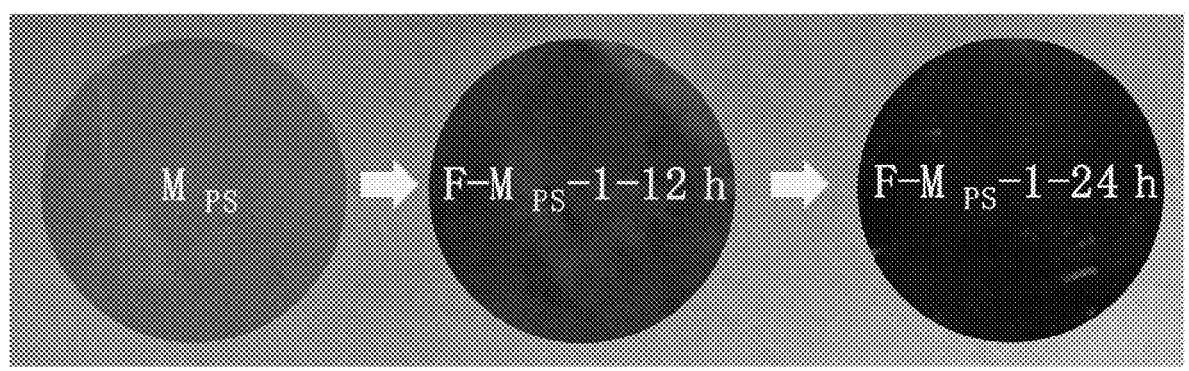
FIGS. 2A-2H.
Figure 4A:
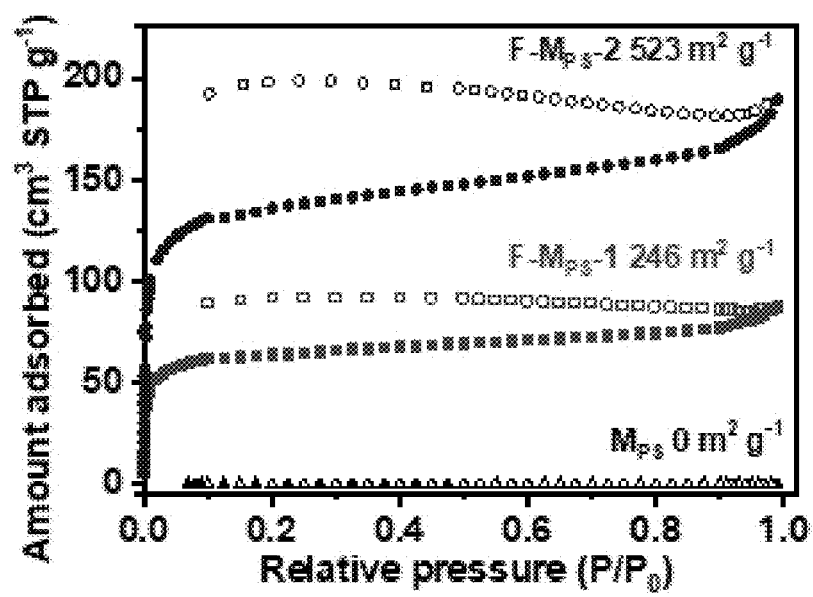
FIGS. 4A-4E.

To demonstrate the basic principle for the in situ cross-linking approach, PS membrane precursor ($M_{PS}$) was fabricated by dissolving commercially available PS in toluene (10 wt %) and casting the obtained solution in a glass petri dish. Subsequently, the non-porous PS membrane was immersed in a mixture of the cross-linker 2,3,5,6-tetrafluoro-1,4-benzenedimethanol (F—OH-1) and the solvent/catalyst $CF_3SO_3H$, which was then treated at 100° C. for cross-linking reaction to take place. The resultant membrane (F-$M_{PS}$-1) was washed with deionized water, tetrahydrofuran (THF) and ethanol, and then dried under vacuum at 60° C. The size and shape of the cross-linked membrane can be adjusted depending on the PS membrane precursor. In this work, $M_{PS}$ with thickness of 33 m and diameter of 12 mm was used for the subsequent cross-linking. Influence of the reaction time on the properties of F-$M_{PS}$-1 (denoted as F-$M_{PS}$-1-t, t=reaction time) was investigated first. After the cross-linking treatment, the translucent and colorless $M_{PS}$ became light (F-$M_{PS}$-1-12 h) and dark brown (F-$M_{PS}$-1-24 h) depending on the reaction time (FIG. 2A). Notably, the cross-linked membrane F-$M_{PS}$-1 was completely insoluble in common organic solvents, such as tetrahydrofuran (THF), dichloromethane and toluene, in which the membrane precursor MPS was readily soluble. In addition, acids with lower acidity than $CF_3SO_3H$ exhibiting Hammett acidity function ($H_0$) of −14.1, i.e., $CH_3SO_3H$ ($H_0$=−7.86) and $H_2SO_4$ ($H_0$=−12) showed rather low catalytic activity in the dehydrative Friedel-Crafts cross-linking reaction of pristine MPS with F—OH-1 under the same reaction conditions (100° C., 24 h), with the resultant membranes still soluble in toluene and THF. Compared with the original $M_{PS}$, the membrane thickness of F-$M_PS$-1 increased to 41 and 49 μm after reaction time of 12 h and 24 h, respectively, which was caused by the introduction of porous structures into the dense phase of MPS (total pore volume: 0 cm$^3$ g$^{-1}$), as reflected by the significantly increased total pore volume in F-$M_{PS}$-1 (0.13 cm$^3$ g$^{-1}$). The Brunauer-Emmett-Teller (BET) surface area of F-$M_{PS}$-1-12 h and F-$M_{PS}$-1-24 h was 139 and 246 m$^2$ g$^{-1}$, respectively, as evaluated by nitrogen adsorption-desorption isotherms. While further increasing the reaction time to 48 h had almost no effect on the surface area of F-$M_{PS}$-1 (249 m$^2$ g$^{-1}$) (FIG. 4A). This indicated that in the presence of excess cross-linker (2 mmol F—OH-1+ 0.43 mmol benzene rings in $M_{PS}$) and under the current conditions, the reaction reached a completion within 24 h via C—C bond formation. The porosity of the membrane cannot be further increased after all the reactive sites on the benzene rings in MPS are connected with the fluorinated cross-linker. As for Friedel-Crafts reactions, introduction of electron-withdrawing groups (fluorinated aromatic rings) will significantly suppress the reactivity of the monomers for the subsequent electrophilic attacks. Therefore, the reaction time of 24 h was used for other cross-linking reactions in this work, and F-$M_{PS}$-1 obtained with the reaction time of 24 h was selected for further characterization and separation performance investigation. The density of the membrane increased from 1.05 cm$^3$ g$^{-1}$ ($M_{PS}$) to 1.21 cm$^3$ g$^{-1}$ (F-$M_{PS}$-1-24 h) due to addition of heavier F atoms within the skeleton.

Figure 2B:
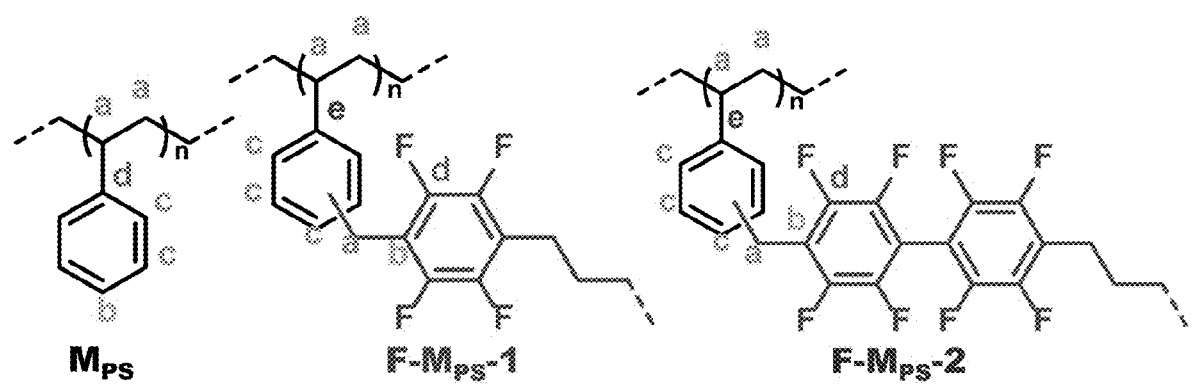
Figure 2C:
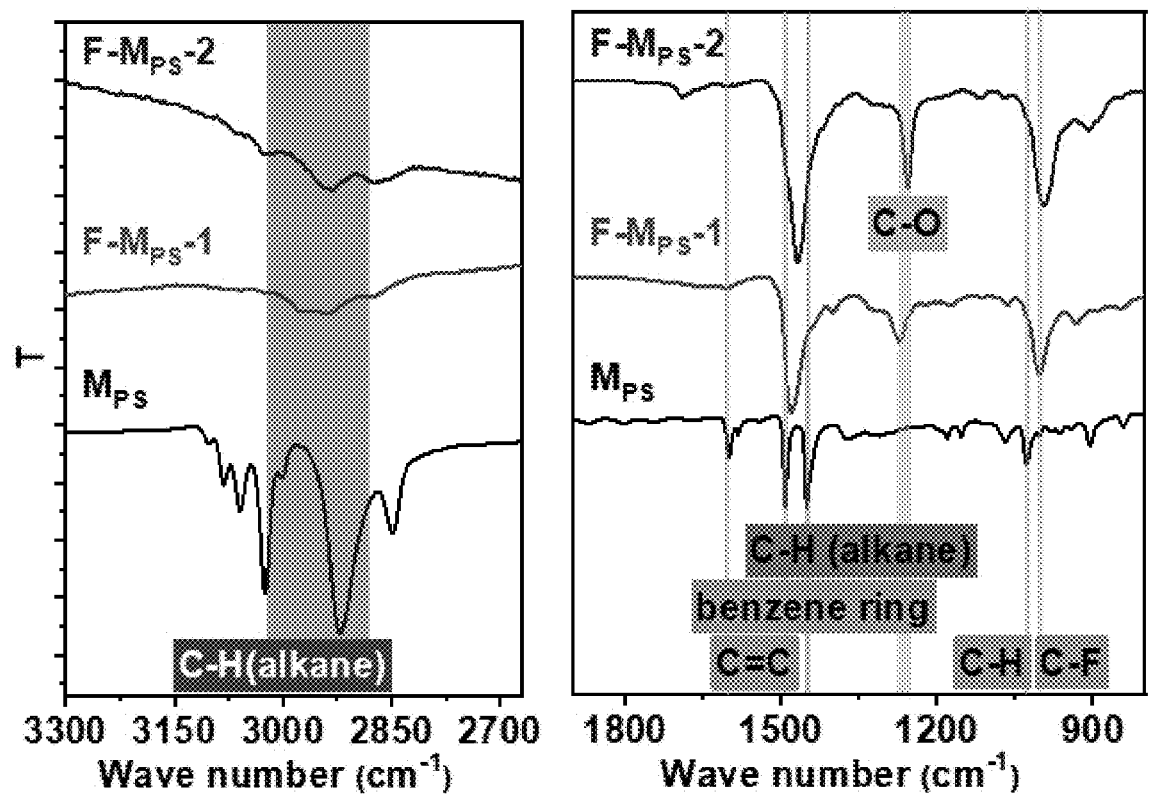
Figure 2D:
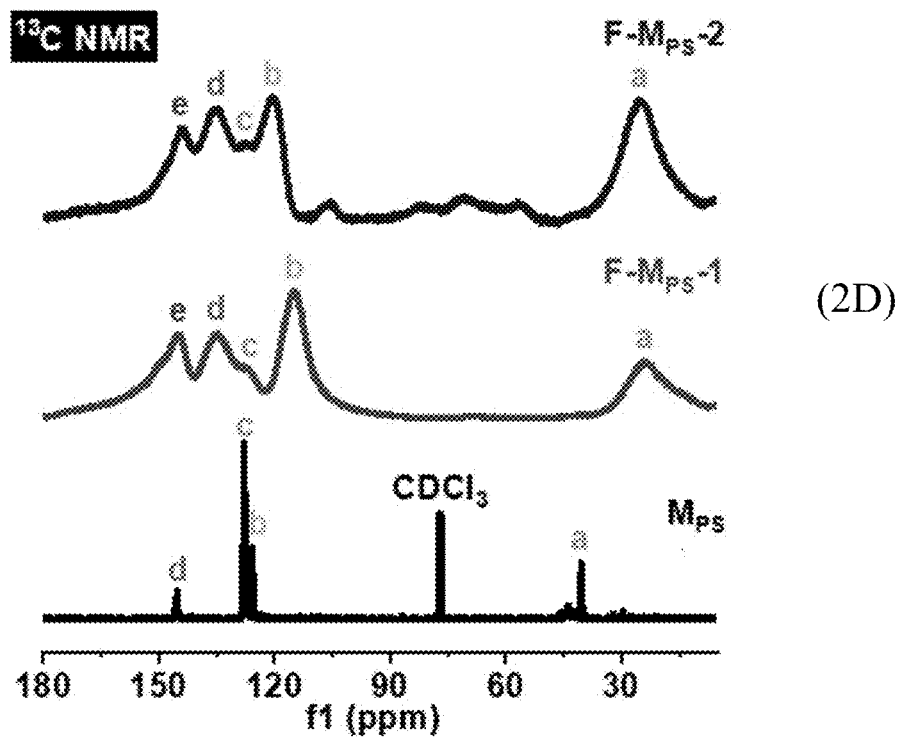
Figure 2E:
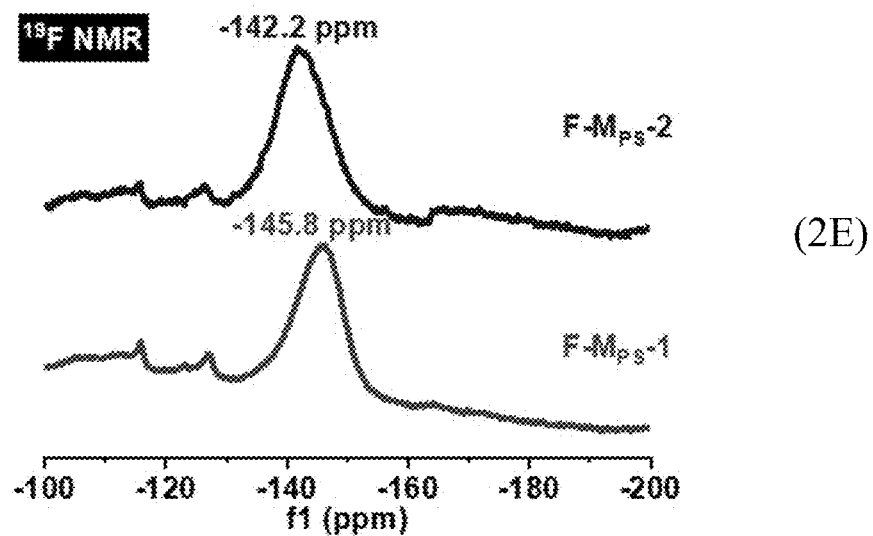
Figure 2F:
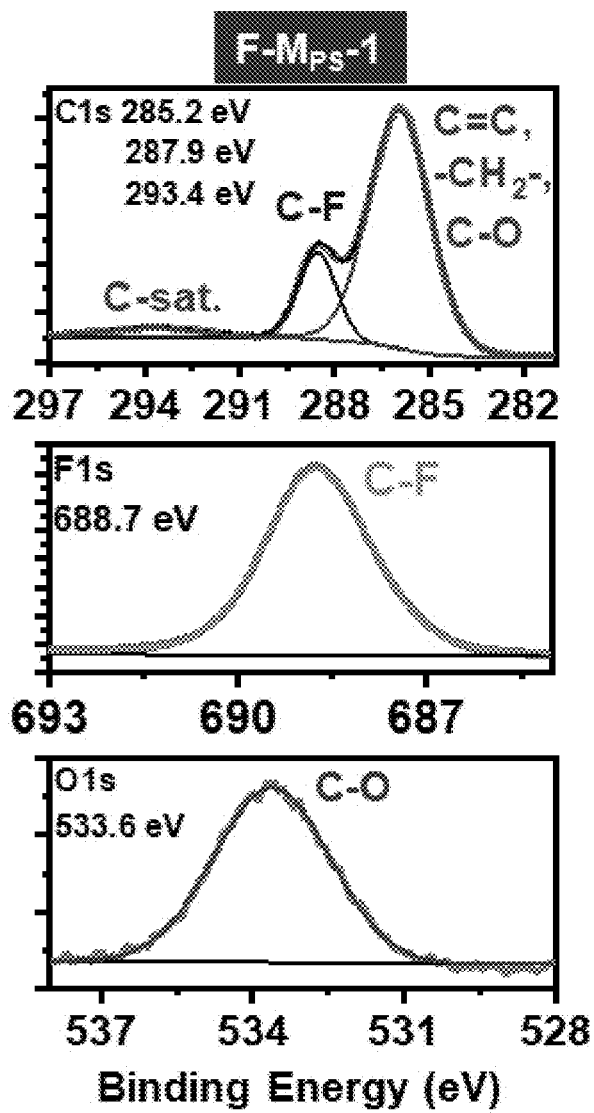
Figure 2G:
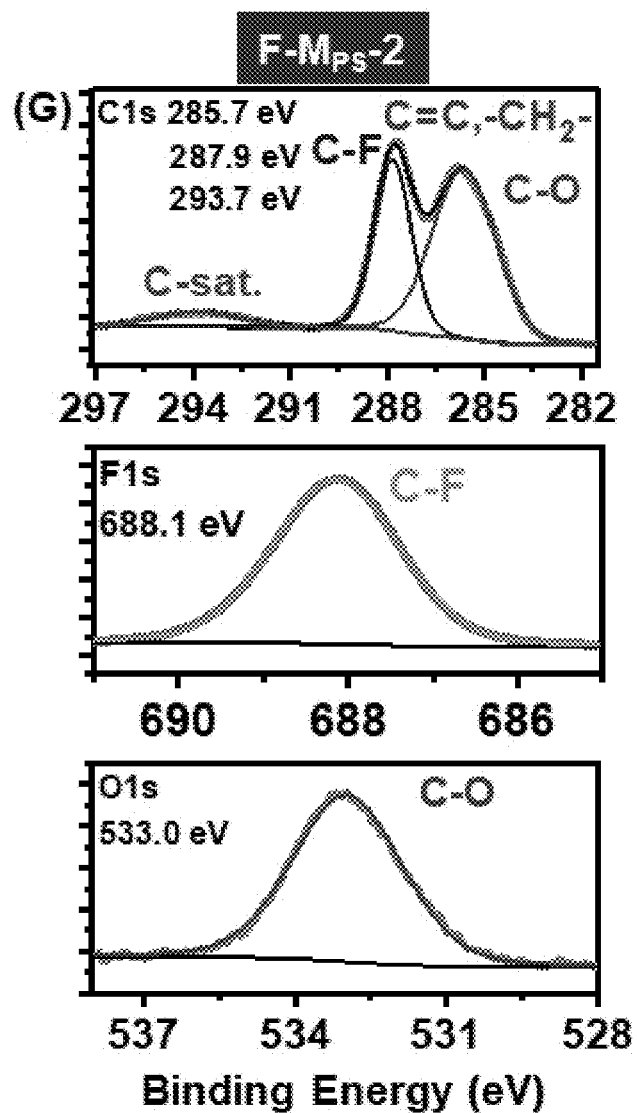
Figure 2H:
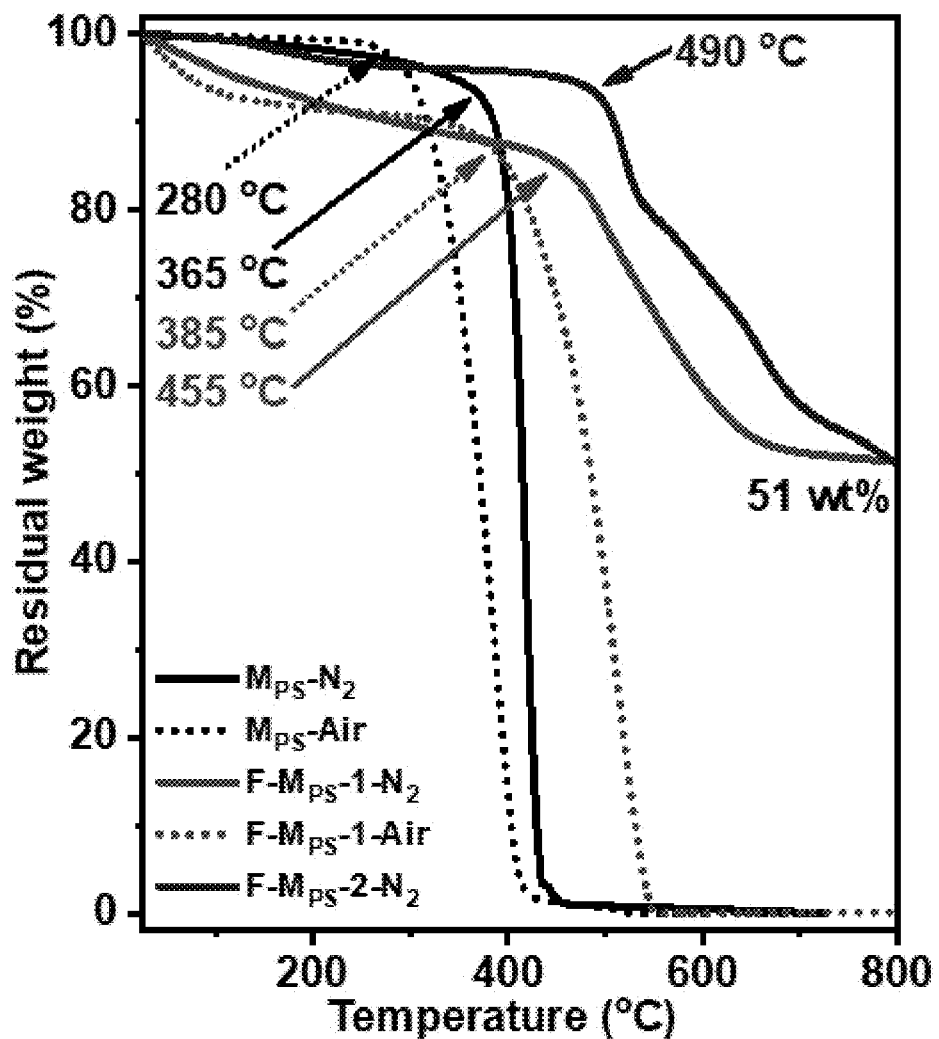

The occurrence of the cross-linking reaction and structure of the afforded membrane was confirmed and characterized by the Fourier-transform infrared (FT-IR) spectra of $M_{PS}$ and F-$M_{PS}$-1 (FIGS. 2B and 2C). The following characteristic peaks were observed in the skeleton of both $M_{PS}$ and F-$M_{PS}$-1: stretching of the C—H bond connected to the benzene ring (1026 cm-1), C═C bond vibration of the benzene ring (1495 and 1606 cm$^{-1}$), and multi peaks located at 2950 cm$^{-1}$ being assigned to the —$CH_2$— moieties. The relatively diminished intensity of the peaks belonging to methylene groups in F-$M_{PS}$-1 was caused by the introduction of large amounts of fluorinated aromatic rings into the skeleton of $M_{PS}$. Compared with the pristine membrane template $M_Ps$, F-$M_{PS}$-1 obtained after being cross-linked by F—OH-1 showed additional signals for C—F bond (1005 cm$^{-1}$) and residual C—O bond (1270 cm$^{-1}$). Furthermore, solid-state cross-polarization magic-angle spinning 13C nuclear magnetic resonance (SS CP/MAS $^{13}$C NMR) analysis further confirmed the efficiency of cross-linking reaction (FIGS. 2B and 2D). The spectrum of the original $M_{PS}$ exhibited the peaks for methylene units (peak a, 40.4 ppm) and benzene rings (peak b-d, 125.8-145.1 ppm). After cross-linking with F—OH-1, carbon signal of the alkyl chains upfield-shifted to 24.3 ppm (peak a) due to introduction of —CH$_2$— groups connected to the fluorinated benzene ring into the membrane skeleton. Aromatic rings in the original M$_{PS}$ skeleton were still present in F-M$_{PS}$-1 (peak c and e), together with the signal for C—F bond (134.8 ppm) and the other two carbons in the fluorinated benzene rings (114.6 ppm). In the solid-state $^1$H NMR spectrum of F-M$_{PS}$-1, two broad peaks located at 0.62 and 0.97 ppm were observed, being assigned to aliphatic and aromatic protons, respectively. In the SS $^{19}$F NMR spectrum of F-M$_{PS}$-1 (FIG. 2E), the peak being assigned to C—F is located at −145.8 ppm, confirming the successful introduction of C—F moieties into the membrane framework. As shown by the X-ray photoelectron spectroscopy (XPS) analysis (FIG. 2F), in the survey spectra of F-Mps-1, C, O and F were the predominant elements, and the overall surface compositions were 77.8%, 2.9% and 18.9%, respectively, as determined using the core level spectra. In the C1s spectrum (FIG. 2F), three peaks could be deconvoluted. The peak with binding energy (BE)=285.2 eV was ascribed to carbons in aromatic rings, methylene groups, and C—O bonds. The presence of characteristic carbon in C—F bonds was confirmed by the presence of the peak with BE=287.9 eV. A small peak with BE of 293.4 eV was assigned to saturated carbon signals (e.g., in residual CF$_3$SO$_3$H). F1s spectrum for C—F bond (BE=688.7 eV) and O1s spectrum for residual oxygen-containing group (BE=533.6 eV) also confirmed the successful polymerization of the MPS precursor with the fluorinated benzylic alcohol cross-linkers. The thermogravimetric analysis (TGA) curves of MPS showed that it began to lose weight at 280° C. in air and 365° C. under nitrogen atmosphere and completely decomposed at ~400° C. both under air and nitrogen atmosphere (FIG. 2H). While the TGA results of F-M$_{PS}$-1 revealed its excellent thermal stability up to 385° C. in air and 455° C. under nitrogen atmosphere, with a significant improvement compared with MPS. Residual weight of 51 wt % was still obtained up to 800° C. under N$_2$, which indicates the possibility to fabricate F-doped porous carbonaceous membrane from F-M$_{PS}$-1.

Figure 3A:
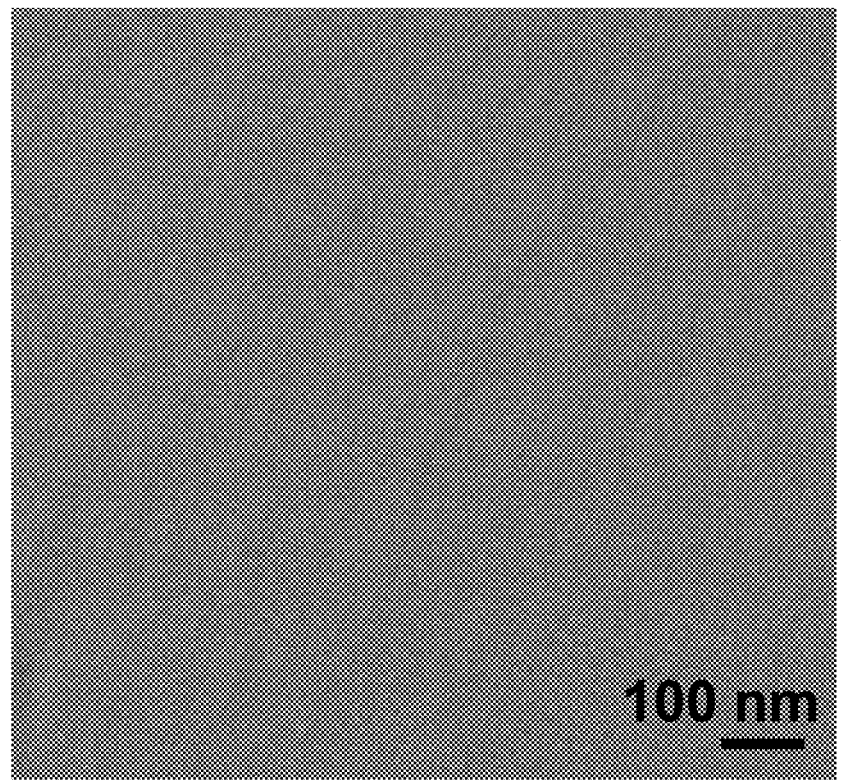
FIGS. 3A-3H.
Figure 3B:
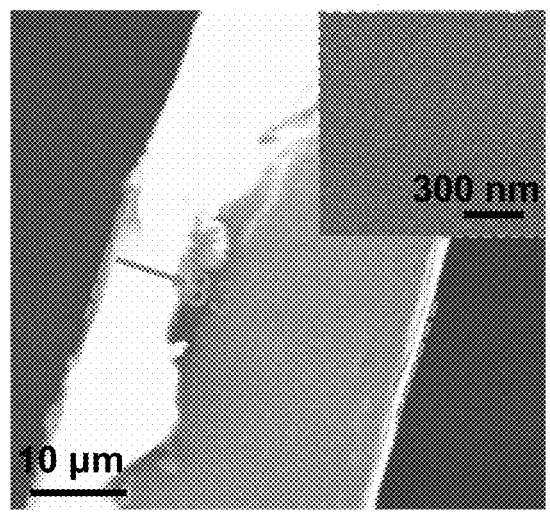
Figure 3C:
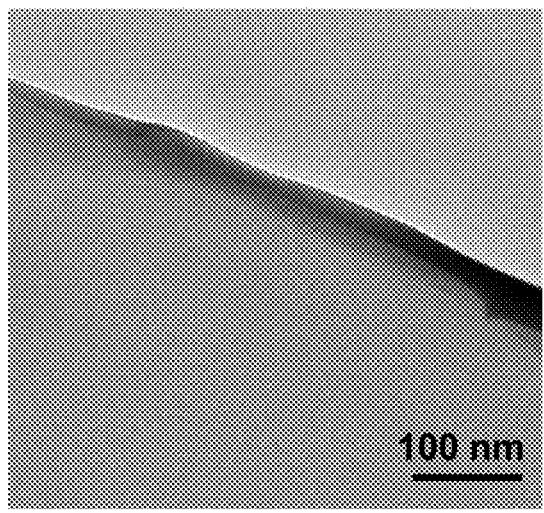
Figure 3D:
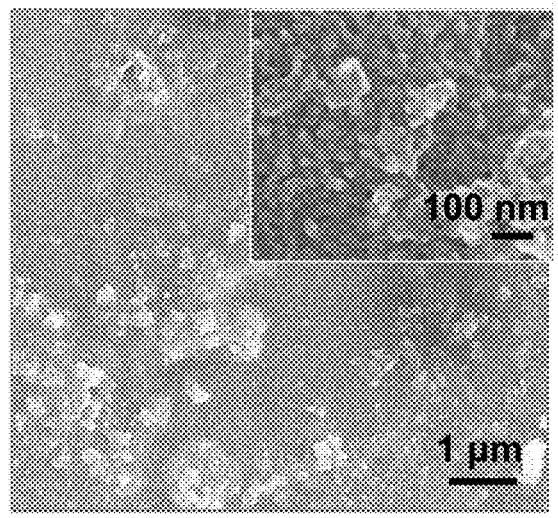
Figure 3E:
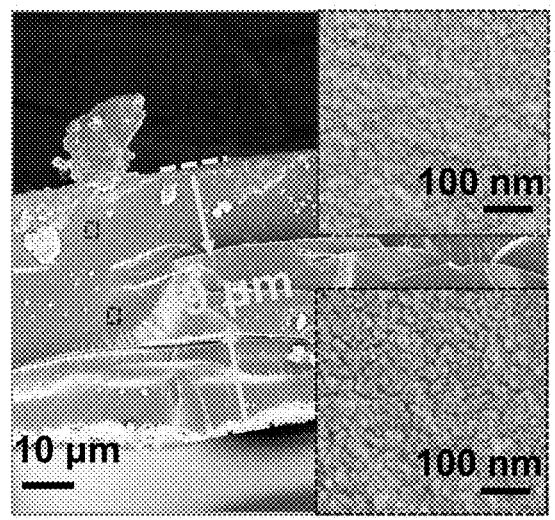
Figure 3F:
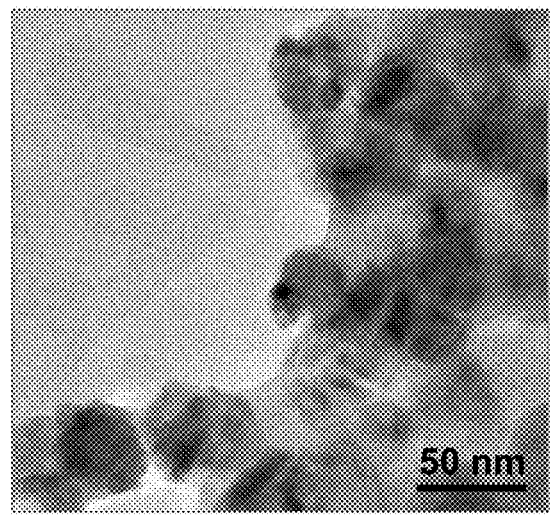
Figure 3G:
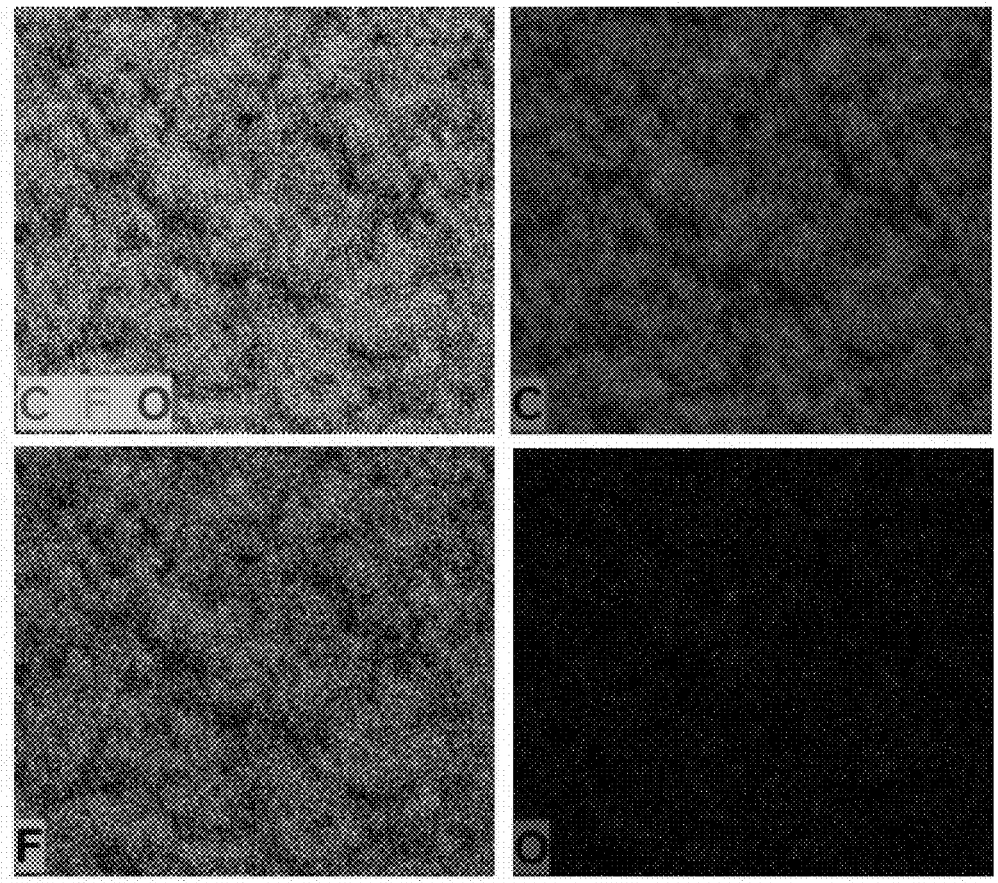
Figure 3H:
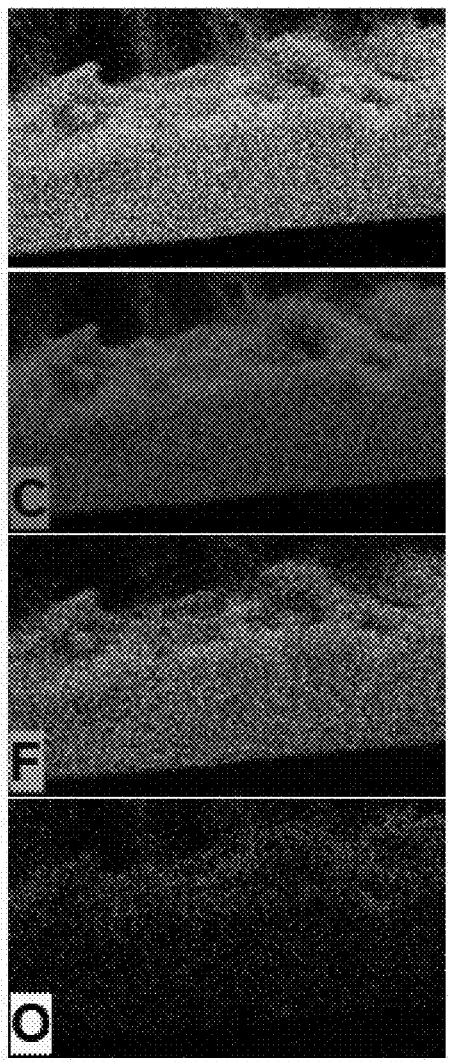

The morphology and nanostructure variation of the membranes before and after cross-linking were further characterized by scanning electron microscopy (SEM) and transmission electron microscopy (TEM) analyses (FIGS. 3A-3F). As shown in FIG. 3A, the surface of M$_{PS}$ membrane was smooth, defect-free and non-porous. The cross-section of M$_{PS}$ was also uniform, smooth and defect-free (FIG. 3B). TEM image of the M$_{PS}$ powder obtained by intensively grinding exhibited smooth film-like morphology without obvious texture features (FIG. 3C). Comparatively, the top view SEM image of F-M$_{PS}$-1 clearly revealed the structure composed of small polymer nanoparticles (FIG. 3D). The cross-sectional SEM images of F-M$_{PS}$-1 showed homogeneous morphology from the surface to the center region of the membrane involving small polymer particles, indicating thorough cross-linking of the original M$_{PS}$ membrane (FIG. 3E). TEM images of F-M$_{PS}$-1, obtained after intensively grinding it, exhibited the presence of small particles within the film-like membrane morphology (FIG. 3F). The corresponding elemental maps of F-M$_{PS}$-1 demonstrated uniform distributions of carbon, fluorine, and residual small amount of oxygen atoms on the surface and cross-section of F-M$_{PS}$-1 (FIGS. 3G and 3H). The energy dispersive spectrometer (EDS) profile collected during the TEM observation also demonstrated the successful introduction of fluorinated moieties into the skeleton of F-M$_{PS}$-1 and the presence of carbon, fluorine, and oxygen within the afforded membrane. The mechanical property of the membranes afforded after cross-linking was relatively inferior owing to flexibility limitation of the M$_{PS}$ precursor and the cross-linker (e.g., F—OH-1), so robust Al$_2$O$_3$ support was introduced to address this issue. Using robust Al$_2$O$_3$-supported M$_{PS}$ as the precursor, the cross-linking reaction was conducted under the otherwise identical conditions to those used for the fabrication of F-M$_{PS}$-1. SEM images of the as-synthesized Al$_2$O$_3$-supported F-M$_{PS}$-1 (both surface and cross sections) exhibited the same morphology as the bare F-M$_{PS}$-1 composed of small polymer particles. In addition, the porous channel structures of the Al$_2$O$_3$ support are well maintained. The corresponding elemental maps of Al$_2$O$_3$ supported F-M$_{PS}$-1 (both surface and cross sections) further demonstrated the uniform distribution of C, F, and residual O within the membrane skeleton, indicating the successful introduction of the fluorinated aromatic rings into the membrane skeleton.

Figure 4B:
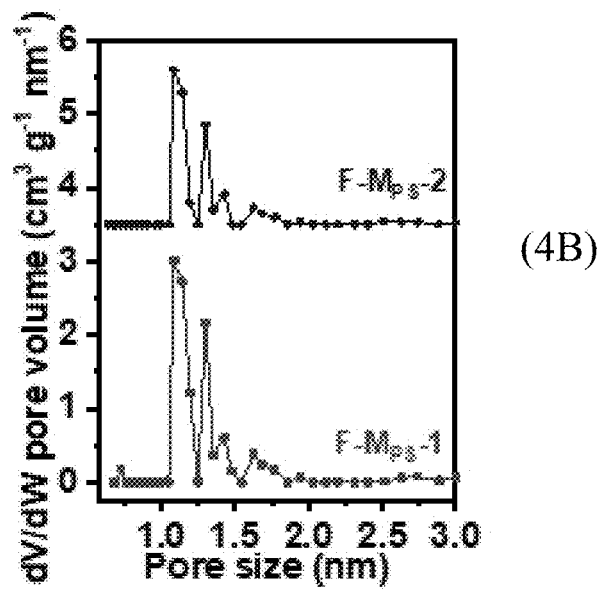

The porosity variation of the membranes before and after cross-linking was evaluated by N$_2$ sorption and desorption analysis measured at 77 K (FIG. 4A). N$_2$ isotherm of the pristine M$_{PS}$ exhibited nearly no uptake capacity with the surface area of 0 m$^2$ g$^{-1}$ due to its nonporous architecture. Comparatively, the as-afforded F-M$_{PS}$-1 showed a microporous architecture with a typical type-I reversible sorption profile. The BET surface area of the crosslinked membrane F-M$_{PS}$-1 was calculated to be 246 m$^2$ g$^{-1}$ with a total pore volume of 0.41 m$^2$ g$^{-1}$. Based on the result obtained using the non-local density functional theory method (NLDFT), the micropores mainly centered at 1.1 and 1.3 nm were present (FIG. 4B). Horvath-Kawazoe pore size distribution curve of F-M$_{PS}$-1 demonstrated the formation of ultramicropores around 0.6 nm within the membrane skeleton (FIG. 4C), which will bring further benefit in the separation of small gas molecules.

Figure 4C:
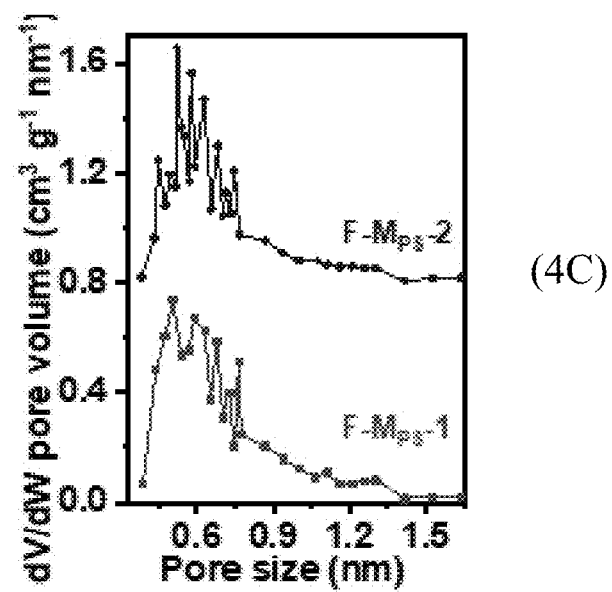

Notably, the structural properties and fluorine content of the cross-linked membranes could be modulated by employing cross-linkers with different structures, e.g. 4,4'-octafluorobibenzenedimethanol (F—OH-2). The cross-linking reaction of the pristine M$_{PS}$ template and F—OH-2 was conducted under the otherwise identical reaction condition and procedure used for the fabrication of F-M$_{PS}$-1. The unit structure of F-M$_{PS}$-2 is shown in FIG. 2B. FT-IR spectrum of F-M$_{PS}$-2 exhibited the characteristic peaks assigned to aliphatic C—H bond (1448 and 2936 cm-1), benzene ring (1490 and 1605 cm$^{-1}$), together with C—O bond (1256 cm$^{-1}$) and C—F functionalities (995 cm$^{-1}$) upon introducing the cross-linked fluorinated benzene rings (FIG. 2C). The CP/MAS $^{13}$C NMR spectrum of F-M$_{PS}$-2 features several peaks belonging to the carbons of methylene groups and benzene rings, especially the involvement of C—F bond (135 ppm) within the membrane skeleton (FIG. 2D). SS $^{19}$F NMR spectrum of F-M$_{PS}$-2 exhibited a broad peak at −142.2 ppm verifying the presence of C—F bond in the skeleton (FIG. 2E). The surface composition of F-M$_{PS}$-2 was determined by XPS analysis (FIG. 2G), which showed a fluorine content of 28.2 at. %. Detailed analysis of C1s spectrum demonstrated the presence of C=C, —CH$_2$—, and C—O (285.7 eV), C—F (287.9 eV), and small amount of residual saturated carbon species (293.7 eV). This was further verified by the F1s spectrum for C—F bond (688.1 eV) and O1s spectrum for C—O (533.0 eV). F-M$_{PS}$-2 also showed high thermal stability under nitrogen atmosphere up to 490° C., making it a potential precursor to fabricate fluorinated carbon molecular sieve membrane (FIG. 2H). As shown by the N$_2$ adsorption and desorption curve at 77 K (FIG. 4A), compared with F-M$_{PS}$-1, the as-prepared F-M$_{PS}$-2 also exhibited a type-I N$_2$ isotherms with higher BET surface area of 523 m$^2$ g$^{-1}$ and total pore volume of 0.28 cm$^3$ g$^{-1}$. Pore size distribution calculated by NLDFT method showed the presence of micropores around 1.1 and 1.3 nm (FIG. 4B), together with ultra-micropores around 0.6 nm in the Horvath-Kawazoe pore size distribution curve (FIG. 4C). Density of F-M$_{PS}$-2 was measured to be 1.32 cm$^3$ g$^{-1}$ due to the introduction of more "heavy" F species into the membrane skeleton, compared with that of the pristine M$_{PS}$ (1.05 cm$^3$ g$^{-1}$) and F-M$_{PS}$-1 (1.21 cm$^3$ g$^{-1}$).

However, when F—OH-3 was utilized as the cross-linker, the M$_{PS}$ membrane precursor dissolved in the mixture of F—OH-3/CF$_3$SO$_3$H, and only polymer powder was collected after the reaction, probably owing to the decreased polarity of the solvent (CF$_3$SO$_3$H) upon addition of F—OH-3 with very high fluorine content. This in situ cross-linking method can be extended to other PS-based block polymer membranes. For example, using PS-block-polybutadiene-block-PS (denoted as M$_{BuPS}$) membrane as the original precursor instead of M$_{PS}$, after cross-linking with F—OH-1, the fluorinated membrane could be obtained (denoted as F-M$_{BuPS}$-1). FTIR spectrum of F-M$_{BuPS}$-1 included the signals of benzene rings (1478 and 1600 cm$^{-1}$), C=C bond of alkene (1706 cm$^{-1}$), and aliphatic C—H bond (2930 cm$^{-1}$), together with C—O bond (1268 cm$^{-1}$) and C—F bond (1003 cm$^{-1}$) arising from the cross-linker F—OH-1. These functionalities were also present in the CP MAS $^{13}$C NMR spectrum of F-M$_{BuPS}$-1, with peaks located at 27.6 ppm (a, aliphatic carbons), 71.3 ppm (b, alkene carbons), 117.3 ppm (c, benzene ring), 130.0 ppm (d and e, benzene ring and C—F bond), and 145.1 ppm (f, benzene ring). The XPS survey spectrum of F-M$_{BuPS}$-1 confirmed the successful introduction of fluorine atoms into the skeleton, as well as C and O elements. The presence of C—F bond was further confirmed by the C1s spectrum (BE=287.5 eV) and F1s spectrum (BE=687.7 eV). TGA analysis of F-M$_{BuPS}$-1 under N$_2$ atmosphere showed the initial decomposition onset of 435° C., which was comparable to that of F-M$_{PS}$-1. The surface area of F-M$_{BuPS}$-1 was measured to be 77 m$^2$ g$^{-1}$ as evaluated by N$_2$ adsorption isotherm at 77 K, which was relatively low due to the flexibility of the polybutadiene chains. All the above results demonstrate the high efficiency of the cross-linking strategy in fabrication of fluorinated nanoporous molecular sieve membranes from nonporous membrane template with aromatic ring functionalities within the skeleton.

Figure 4D:
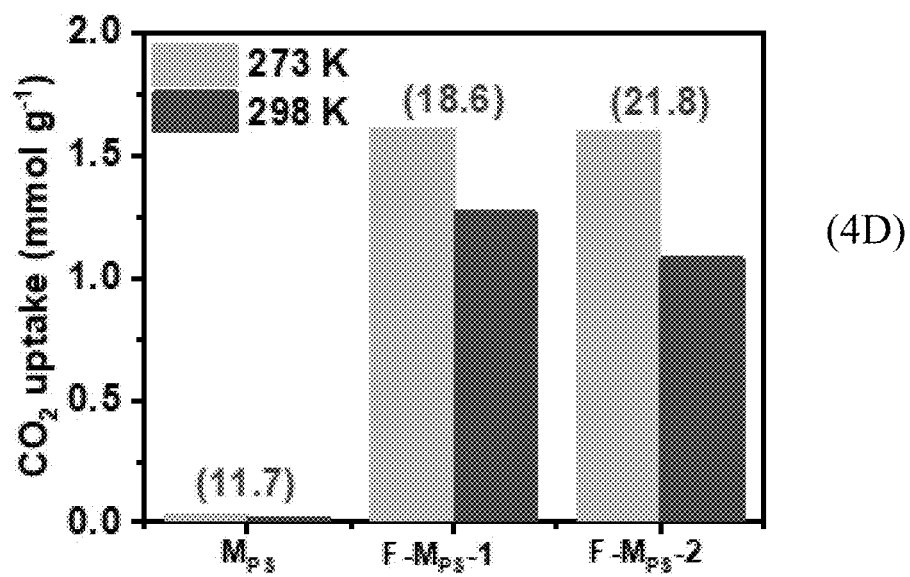

F-M$_{PS}$-1 and F-M$_{PS}$-2 with relatively higher surface areas were selected for further investigation in CO$_2$ separation performance. The CO$_2$ adsorption performance of the fluorinated molecular sieve membranes were first assessed by CO$_2$ isotherms (FIG. 4D). The M$_{PS}$ precursor with nonporous architecture had fairly low CO$_2$ uptake capacity (0.036 mmol g$^{-1}$ at 273 K and 0.024 mmol g$^{-1}$ at 298 K). Comparatively, F-M$_{PS}$-1 with micro- and ultra-micropores exhibited significantly enhanced CO$_2$ uptake performance, with CO$_2$ uptake capacity of 1.61 (273 K) and 1.27 mmol g$^{-1}$ (298 K). The porosity evaluation results demonstrated that the surface area of F-M$_{PS}$-2 (523 m$^2$ g$^{-1}$) was higher than F-M$_{PS}$-1 (246 m$^2$ g$^{-1}$), and they exhibited similar pore size distributions, but similar CO$_2$ uptake capacity was achieved by F-M$_{PS}$-2 (1.60 mmol g$^{-1}$ at 273 K and 1.08 mmol g$^{-1}$ at 298 K), owing to the higher F content in F-M$_{PS}$-2 compared with F-M$_{PS}$-1 and higher molecular weight of F compared with H. The isosteric heats of adsorption (Q$_{st}$) at low adsorption values were calculated to be 18.5 and 21.8 kJ mol$^{-1}$ for F-M$_{PS}$-1 and F-M$_{PS}$-2, respectively (FIG. 4D), which was much higher than that of M$_{PS}$ (11.7 kJ mol$^{-1}$), indicating a strong dipole-quadrupole interaction between the polarizable CO$_2$ molecules and the C—F bond within the membrane frameworks after cross-linking. This may lead to enhanced CO$_2$ adsorption along the pore surface and thus improved CO$_2$ separation performance of the membrane.

Figure 4E:
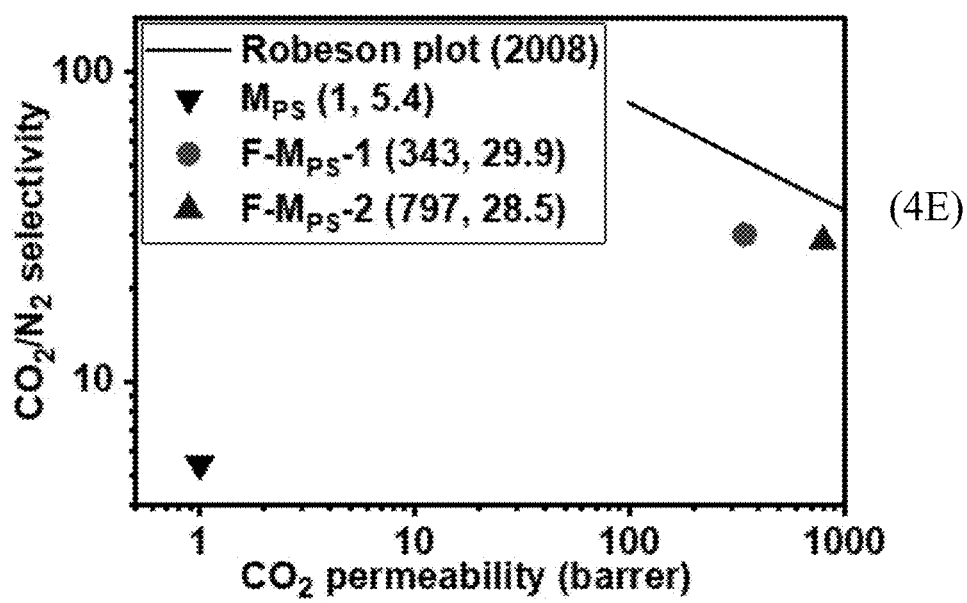

The CO$_2$ separation performance of the membranes was examined using a non-steady-state permeation cell at 298 K. A plot of an ideal CO$_2$/N$_2$ selectivity ($\alpha$(CO$_2$/N$_2$)) versus CO$_2$ permeability (P$_{CO2}$) is shown in FIG. 4E. Notably, the CO$_2$ flux through the M$_{PS}$ membranes was very low, with P$_{CO2}$<1 barrer together with $\alpha$(CO$_2$/N$_2$) of 5.4, due to the non-porous structure. Comparatively, significantly improved membrane separation performance of F-M$_{PS}$-1 was achieved, with P$_{CO2}$ of 343 barrer together with $\alpha$(CO$_2$/N$_2$) of 29.9. As expected, F-M$_{PS}$-2 with higher surface area and fluorine content showed better CO$_2$ separation performance, P$_{CO2}$ of 797 barrer and $\alpha$(CO$_2$/N$_2$) of 28.5, that is, with the values much closer to the upper bound of the Robeson plot (2008). As stated above, introducing more C—F bonds into the membrane backbone led to the significant increase in the CO$_2$ separation performance. However, the CO$_2$ permeability and selectivity were still unsatisfactory for practical applications due to relatively low surface area (compared with the carbon molecular sieve membranes shown below) and relatively broader pore size distribution (0.3-2.0 nm).

For molecular sieve membranes, rigid frameworks and engineered ultramicropores (<0.7 nm) were attractive to provide good separation performance for small gas molecule pairs, permitting enhancement in intrinsic diffusion selectivity by tuning aperture size and simultaneous enhancement in intrinsic sorption selectivity by tuning the structural properties through introduction of CO$_2$-philic functionality. Cleavage of C—F bond during the pyrolysis process led to formation of ultramicropores (~0.5 nm) in the synthesis of carbonaceous molecular sieve membranes. This is a very attractive strategy for molecular sieve membrane development. In addition, high thermal stability of both F-M$_{PS}$-1 and F-M$_{PS}$-2 made them suitable precursors to fabricate fluorinated carbon molecular sieve membranes (F-M$_{PS}$-1/2-T, T=pyrolysis temperature). Notably, the onset decomposition temperature of F-M$_{PS}$-1 and F-M$_{PS}$-2 was 455 and 490° C., respectively (FIG. 2H), under N$_2$ atmosphere, offering the opportunity to fabricate membranes with improved porosity via cleavage of the surface functionalities (e.g. C—H and C—F bonds) in stages via control over the pyrolysis temperatures.

Figure 5A:
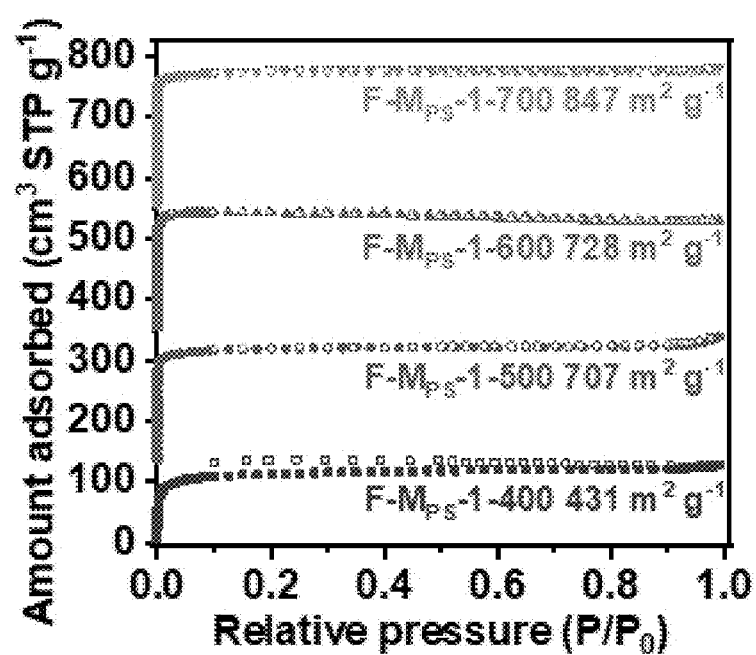
FIGS. 5A-5H.
Figure 5B:
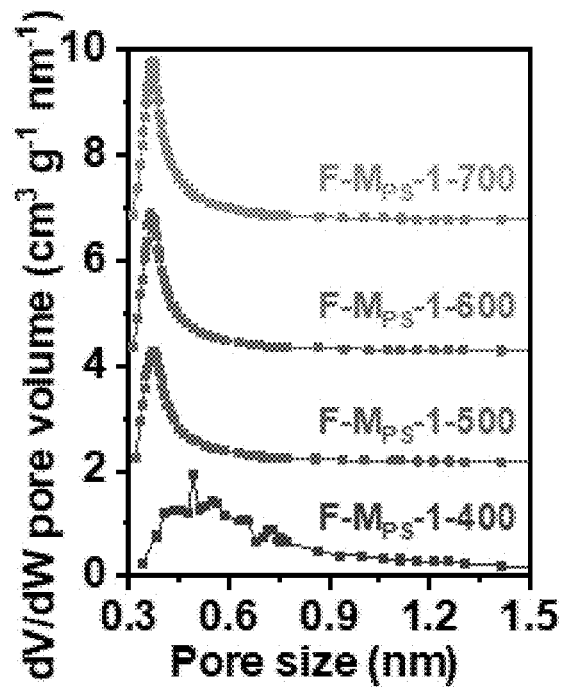
Figure 5C:
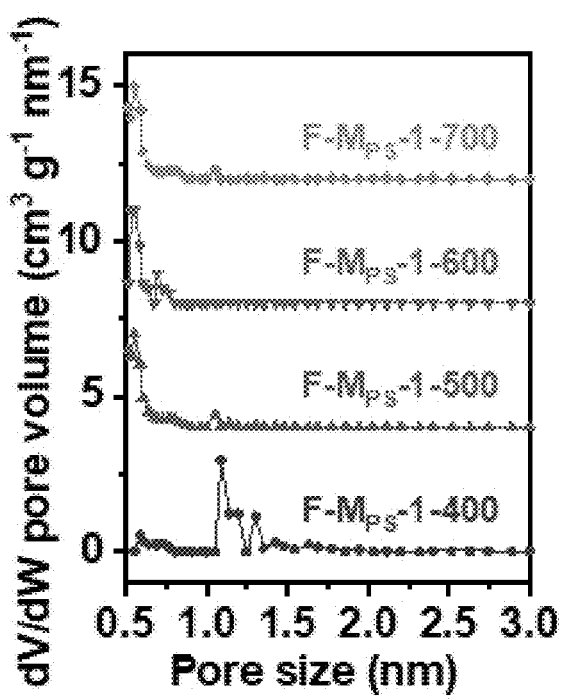
Figure 5D:
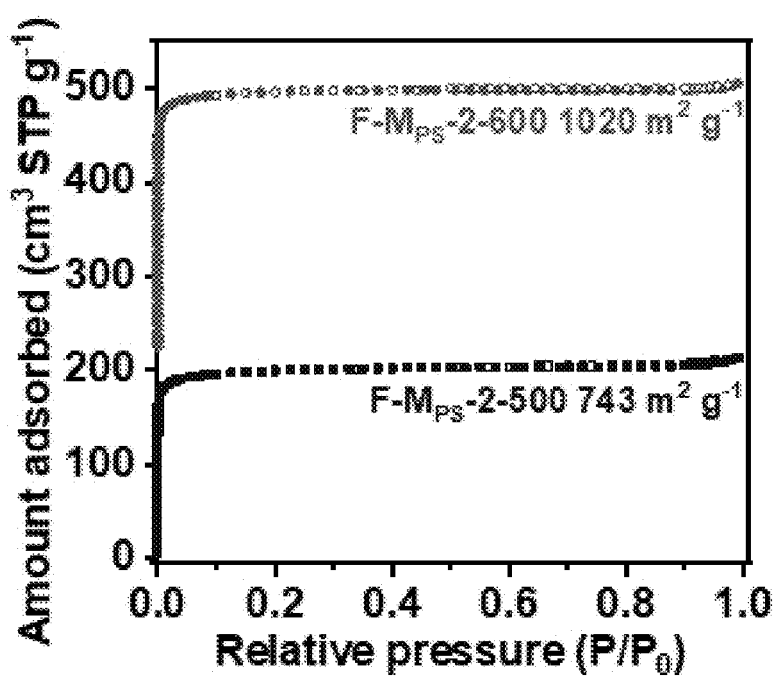
Figure 5E:
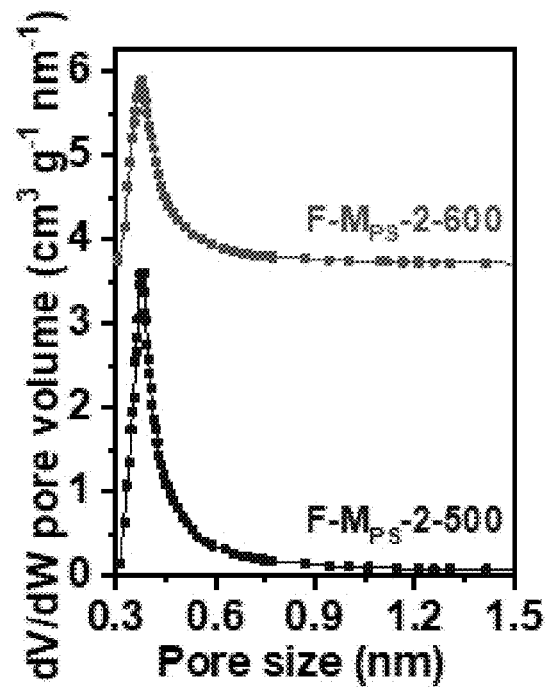
Figure 5F:
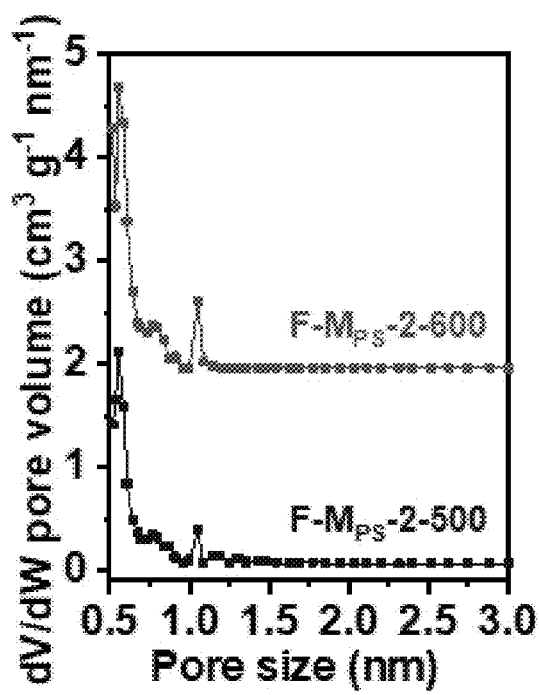
Figure 5G:
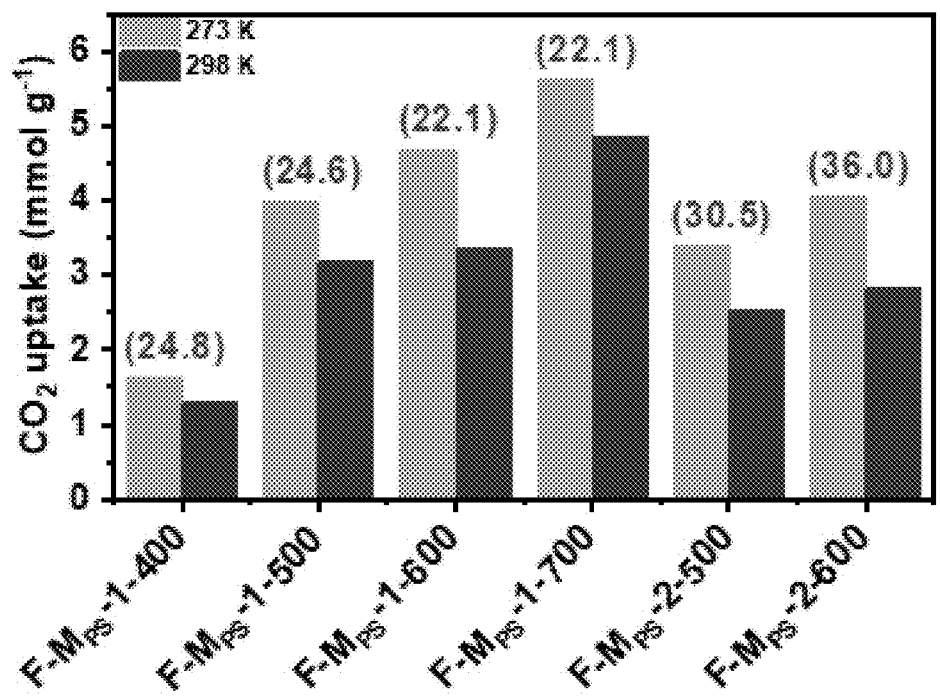
Figure 5H:
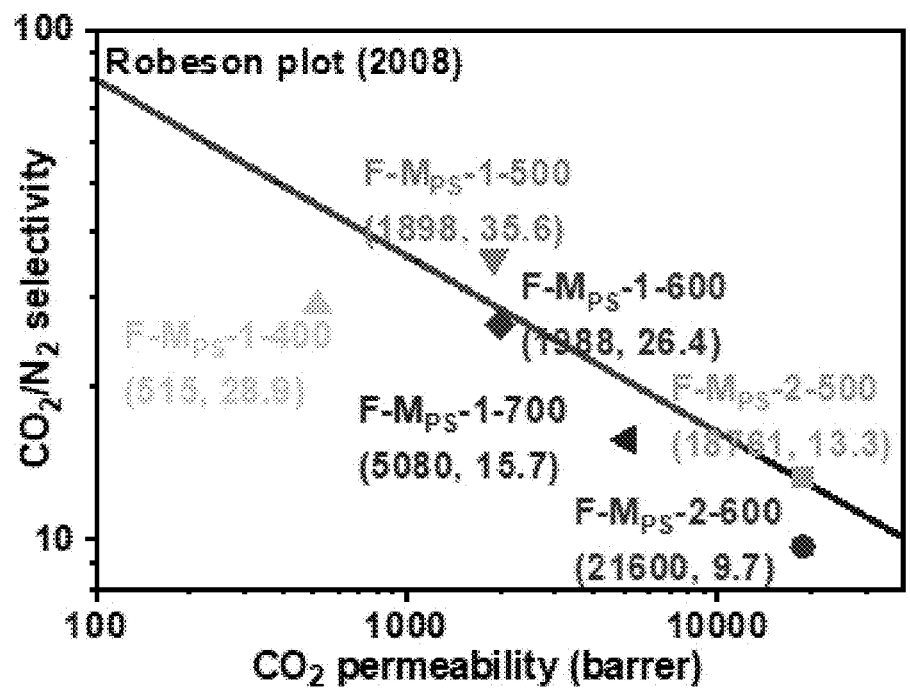

Textural information of F-M$_{PS}$-1/2-T and their CO$_2$ uptake capacity, Q$_{st}$ and CO$_2$/N$_2$ separation performance are shown in FIGS. 5A-5H. When F-M$_{PS}$-1 was used as a membrane precursor and underwent pyrolysis treatment at 400° C. under N$_2$ atmosphere, surface area of the resultant carbon molecular sieve membrane F-M$_{PS}$-1-400 slightly increased to 431 m$^2$ g$^{-1}$ (FIG. 5A). However, it showed similar pore size distribution to that in F-M$_{PS}$-1, indicating no significant cleavage of the chemical bonds in the backbone (FIGS. 5B-5C vs. FIGS. 4B-4C). Enhanced P$_{CO2}$ was observed (515 barrer) while high $\alpha$(CO$_2$/N$_2$) of 28.9 was still maintained (FIG. 5H). Further increasing the pyrolysis temperature to 500° C. led to formation of F-M$_{PS}$-1-500 with surface area of 707 m$^2$ g$^{-1}$ and the presence of ultra-micropores with size distribution centered around 0.37 and 0.55 nm (FIGS. 5B-5C). Accordingly, increased CO$_2$ uptake capacity of 4.00 (273 K) and 3.18 mmol g$^{-1}$ (298 K) together with Q$_{st}$ of 24.5 kJ mol$^{-1}$ were obtained (FIG. 5D). Owing to the excellent textural structure, improved P$_{CO2}$ of 1898 barrer together $\alpha$(CO$_2$/N$_2$) of 35.6 was achieved, exceeding the upper bound limit suggested by Robeson in 2008 (FIG.

5H). The fluorine content on the surface of F-$M_{PS}$-1-500 was found to be 2.0 at. % according to the XPS analysis. Therefore, the good separation performance of F-$M_{PS}$-1-500 was derived from the synergistic effect of high surface area, abundant ultramicropores, and decoration with $CO_2$-philic C—F bonds within the backbone. Ultra-microporosity (around 0.37 and 0.55 nm) persisted in carbon molecular sieve membranes obtained even at higher pyrolysis temperature, and F-$M_{PS}$-1-600 and F-$M_{PS}$-700 exhibited much higher surface areas of 728 and 847 $m^2$ $g^{-1}$ (FIGS. 5A-5C), as well as $CO_2$ uptake capacity up to 5.62 (273 K) and 4.85 mmol $g^{-1}$ (298 K), respectively (FIG. 5G).

The separation performance ($P_{CO2}$, ($\alpha(CO_2/N_2)$)) of F-$M_{PS}$-1-600 (1988 barrer, 26.4) and F-$M_{PS}$-1-700 (5080 barrer, 15.7) (FIG. 5H) indicated that although high surface area led to increased $CO_2$ permeability, the $CO_2/N_2$ selectivity decreased probably due to the cleavage of additional C—F bonds within the membrane skeleton at higher pyrolysis temperature. Indeed, the surface fluorine content was determined to be 1.0 at. % in F-$M_{PS}$-1-600 and only 0.1 at. % in F-$M_{PS}$-1-700, further highlighting the important role fluorine functionalities play in achieving high $CO_2$ separation selectivity. Subsequently, carbon molecular sieve membranes derived from F-$M_{PS}$-2 were fabricated by thermal treatment under nitrogen atmosphere at 500° C. Structural properties of F-$M_{PS}$-2-500 featured by high residual surface fluorine content of 10.0 at. %, surface area of 743 $m^2$ $g^{-1}$ and the presence of ultra-micropores led to a significantly improved $CO_2$ separation performance (FIGS. 5D-5H), with $P_{CO2}$ of 18761 barrer and $\alpha(CO_2/N_2)$ of 13.3, superposed with the most recent upper bound. Further increasing the pyrolysis temperature to 600° C. produced F-$M_{PS}$-2-600 with the highest surface area of 1020 $m^2$ $g^{-1}$ and also the highest $P_{CO2}$ of 21600 barrer, but decreased $\alpha(CO_2/N_2)$ of 9.7, probably due to the decreased fluorine content (3.9 at. %). As stated above, the fluorinated carbon molecular sieve membranes with high surface area and abundant ultra-micropores were successfully fabricated with the as-synthesized fluorinated polymeric membranes as templates, which exhibited improved $CO_2$ separation performance superposing or even exceeding the Robeson 2008 upper bound limit.

Performance of F-$M_{PS}$-1 and F-$M_{PS}$-1-500 after aging was conducted to study their stabilities. The membranes were exposed to air for one week after each run. The results showed that for F-$M_{PS}$-1, slight decrease of both the $P_{CO2}$ and $\alpha(CO_2/N_2)$ was observed in the initial three cycles, that is, from $P_{CO2}$ of 343 barrer together with $\alpha(CO_2/N_2)$ of 29.9 in the $1_{st}$ run, to $P_{CO2}$ of 312 barrer with $\alpha(CO_2/N_2)$ of 28.0 in the 2nd run, and $P_{CO2}$ of 299 barrer with $\alpha(CO_2/N_2)$ of 27.7 in the 3rd run. Subsequently, the performance of F-$M_{PS}$-1 was steady within a time span of 10 weeks. The initial decrease was probably attributed to the interaction of the surface functionalities on F-$M_{PS}$-1 with $H_2O$ vapor or other gaseous moieties in air, occupying the reactive sites for $CO_2$ and the porosity within the skeletons. Comparatively, the carbon molecular sieve membrane (F-$M_{PS}$-1-500) obtained after high temperature treatment under $N_2$ showed higher stability in air, with only slight decrease in performance in the $2^{nd}$ run ($P_{CO2}$ of 1889 barrer with $\alpha(CO_2/N_2)$ of 35.1) compared with fresh one ($P_{CO2}$ of 1898 barrer with $\alpha(CO_2/N_2)$ of 35.6). Its performance was consistent during the following 10 weeks. The foregoing results may be a result of the presence of fewer functionalities on the surface of F-$M_{PS}$-1-500 compared to that of F-$M_{PS}$-1 and hence fewer sites that could potentially interact with air components, which can diminish the material's $CO_2$ separation performance.

Generally, gas separation performance of membranes in mixed gas test will be inferior compared with the single gas runs mainly ascribed to the competitive sorption effect. To probe the behavior of F-$M_{PS}$-1-500, a binary $CO_2/N_2$ separation test was conducted at 298 K with the feeding ratio of 15:85. Compared with the single gas separation behavior ($P_{CO2}$ of 1898 barrer with $\alpha(CO_2/N_2)$ of 35.6), a decreased $\alpha(CO_2/N_2)$ of 27 together with slightly increased $P_{CO2}$ of 2329 barrer was observed. With the feeding ratio of $CO_2/N_2$ increased to 50:50, higher $P_{CO2}$ of 3261 barrer was achieved but with inferior $\alpha(CO_2/N_2)$ of 21.4. For gas separation in practical circumstances, another inevitable composition possessing competing adsorption ability with $CO_2$ in the atmosphere is $H_2O$ molecules, which will lead to decreased selectivity upon occupation of the active sites. For example, in the presence of $H_2O$, the $CO_2$ separation performance of MOF-derived materials was significantly diminished owing the structural collapse caused by $H_2O$ introduction. Under relatively high humidity (90%) conditions, the $CO_2/N_2$ separation performance of F-$M_{PS}$-1-500 was assessed with $CO_2/N_2$ feeding ratio of 50:50. The result demonstrated that only slightly decreased $P_{CO2}$ of 3008 barrer together with a similar $\alpha(CO_2/N_2)$ of 20.9 was obtained, compared with that obtained under dry conditions ($P_{CO2}$ of 3261 barrer with $\alpha(CO_2/N_2)$ of 21.4). The "waterproof" feature of F-$M_{PS}$-1-500 was ascribed to its stable skeleton mainly composed of C—C bond and the involvement of hydrophobic fluorinated moieties, making it a promising candidate for practical gas separation applications.

The cross-linking agent is not limited to perfluorinated bis-benzylic alcohols. In addition, corresponding benzylic esters (acetate, benzoate etc.) or benzyl halides or pseudo halides (Cl, Br, OTs, OTf etc.) could be used. Additionally, corresponding aldehydes could be used as well. Moreover, any halogen, or heteroatom functional group on the aryl ring can be used, especially if all available hydrogen atoms in the parent aromatic ring are substituted. With the presence of electron withdrawing groups, only one group per substrate is sufficient ($NO_2$, $CF_3$, $SO_2R$, and the like). Polymeric substrate is not limited to only pure polystyrene. Block copolymers and random polymers and/or any combination of polymers may be used, as long as they contain aromatic fragments amenable to electrophilic reactions. Namely, polyphenylethers and their derivatives, polyarylsulfides and the like.

While there have been shown and described what are at present considered the preferred embodiments of the invention, those skilled in the art may make various changes and modifications which remain within the scope of the invention defined by the appended claims.

What is claimed is:

1. A crosslinked microporous membrane composition useful in gas separation, the membrane comprising:
    (i) an aromatic polymer containing a multiplicity of benzene rings; and
    (ii) a multiplicity of fluorinated aromatic moieties, each fluorinated aromatic moiety containing at least two separate methylene (—$CH_2$—) linkages connected to benzene rings on the aromatic polymer;
    wherein the cross-linked microporous membrane possesses micropores having a pore size of up to 2 nm.

2. The membrane composition of claim 1, wherein said aromatic polymer is non-fluorinated.

3. The membrane composition of claim 1, wherein said aromatic polymer comprises polystyrene or a copolymer thereof.

4. The membrane composition of claim 1, wherein said aromatic polymer comprises a block copolymer of polystyrene and polybutadiene.

5. The membrane composition of claim 1, wherein at least a portion of said micropores are ultra-micropores having a size of less than 1 nm.

6. The membrane composition of claim 1, wherein at least a portion of said micropores are ultra-micropores having a size of no more than 0.5 nm.

7. The membrane composition of claim 1, wherein at least a portion of said fluorinated aromatic moieties are bivalent.

8. The membrane composition of claim 1, wherein at least a portion of said fluorinated aromatic moieties are trivalent.

9. The membrane composition of claim 1, wherein at least a portion of said fluorinated aromatic moieties have the following structure:

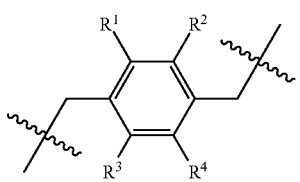

(1)

wherein $R^1$, $R^2$, $R^3$, and $R^4$ are independently selected from the group consisting of hydrogen atom (H), fluorine atom (F), and hydrocarbon groups (R) containing one to twelve carbon atoms, optionally substituted with fluorine; wherein $R^1$ and $R^2$ are optionally interconnected, and/or $R^3$ and $R^4$ are optionally interconnected; and wherein at least 50% of hydrogen atoms bound to aromatic rings in the structure of Formula (1) are substituted with fluorine atoms.

10. The membrane composition of claim 1, wherein at least a portion of said fluorinated aromatic moieties have the following structure:

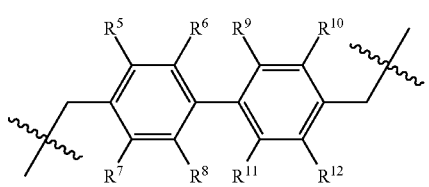

(2)

wherein $R^5$, $R^6$, $R^7$, $R^8$, $R^9$, $R^{10}$, $R^{11}$, and $R^{12}$ are independently selected from the group consisting of hydrogen atom (H), fluorine atom (F), and hydrocarbon groups (R) containing one to twelve carbon atoms, optionally substituted with fluorine; wherein $R^5$ and $R^6$ are optionally interconnected, and/or $R^7$ and $R^8$ are optionally interconnected; and/or $R^9$ and $R^{10}$ are optionally interconnected; and/or $R^{11}$ and $R^{12}$ are optionally interconnected; and wherein at least 50% of hydrogen atoms bound to aromatic rings in the structure of Formula (2) are substituted with fluorine atoms.

11. The membrane composition of claim 1, wherein at least a portion of said fluorinated aromatic moieties have the following structure:

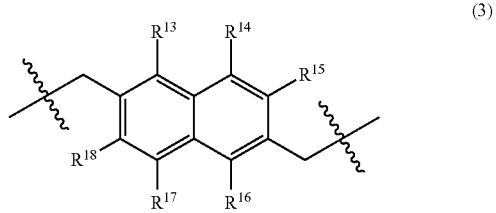

(3)

wherein $R^{13}$, $R^{14}$, $R^{15}$, $R^{16}$, $R^{17}$, and $R^{18}$ are independently selected from the group consisting of hydrogen atom (H), fluorine atom (F), and hydrocarbon groups (R) containing one to twelve carbon atoms, optionally substituted with fluorine; wherein $R^{13}$ and $R^{14}$ are optionally interconnected, and/or $R^{14}$ and $R^{15}$ are optionally interconnected; and/or $R^{16}$ and $R^{17}$ are optionally interconnected; and/or $R^{17}$ and $R^{18}$ are optionally interconnected; and wherein at least 50% of hydrogen atoms bound to aromatic rings in the structure of Formula (3) are substituted with fluorine atoms.

12. The membrane composition of claim 1, wherein at least a portion of said fluorinated aromatic moieties have the following structure:

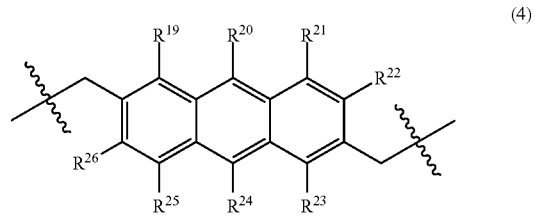

(4)

wherein $R^{19}$, $R^{20}$, $R^{21}$, $R^{22}$, $R^{23}$, $R^{24}$, $R^{25}$, and $R^{26}$ are independently selected from the group consisting of hydrogen atom (H), fluorine atom (F), and hydrocarbon groups (R) containing one to twelve carbon atoms, optionally substituted with fluorine; wherein $R^{19}$ and $R^{20}$ are optionally interconnected, and/or $R^{20}$ and $R^{21}$ are optionally interconnected; and/or $R^{21}$ and $R^{22}$ are optionally interconnected; and/or $R^{23}$ and $R^{24}$ are optionally interconnected; and/or $R^{24}$ and $R^{25}$ are optionally interconnected; and/or $R^{25}$ and $R^{26}$ are optionally interconnected; and wherein at least 50% of hydrogen atoms bound to aromatic rings in the structure of Formula (4) are substituted with fluorine atoms.

13. The membrane composition of claim 1, wherein at least a portion of said fluorinated aromatic moieties have the following structure:

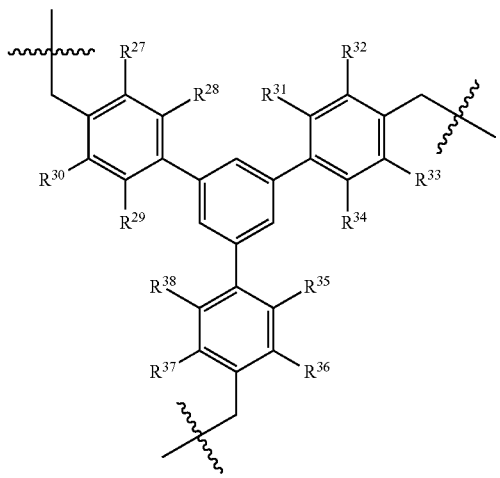

(5)

wherein $R^{27}$, $R^{28}$, $R^{29}$, $R^{30}$, $R^{31}$, $R^{32}$, $R^{33}$, $R^{34}$, $R^{35}$, $R^{36}$, $R^{37}$, and $R^{38}$ are independently selected from the group consisting of hydrogen atom (H), fluorine atom (F), and hydrocarbon groups (R) containing one to twelve carbon atoms, optionally substituted with fluorine; wherein $R^{27}$ and $R^{28}$ are optionally interconnected, and/or $R^{29}$ and $R^{30}$ are optionally interconnected; and/or $R^{31}$ and $R^{32}$ are optionally interconnected; and/or $R^{33}$ and $R^{34}$ are optionally interconnected; and/or $R^{35}$ and $R^{36}$ are optionally interconnected; and/or $R^{37}$ and $R^{38}$ are optionally interconnected; and wherein at least 50% of hydrogen atoms bound to aromatic rings in the structure of Formula (5) are substituted with fluorine atoms.

14. The membrane composition of claim 1, wherein the membrane has a thickness of no more than 100 microns.

15. The membrane composition of claim 1, wherein the membrane has a fluorine content of at least 20 wt %.

16. A method for at least partially separating carbon dioxide gas from a carbon dioxide-containing mixture of gases, the method comprising passing the carbon dioxide-containing mixture of gases through a crosslinked polymer microporous membrane, wherein gas exiting the microporous polymer membrane has an increased carbon dioxide concentration relative to the initial carbon dioxide-containing mixture of gases not passed through the microporous polymer membrane;

wherein said crosslinked microporous membrane comprises:
(i) an aromatic polymer containing a multiplicity of benzene rings;
(ii) a multiplicity of fluorinated aromatic moieties, each fluorinated aromatic moiety containing at least two separate methylene ($—CH_2—$) linkages connected to benzene rings on the aromatic polymer;
wherein the cross-linked microporous membrane possesses micropores having a pore size of up to 2 nm.

17. The method of claim 16, wherein the carbon dioxide-containing mixture of gases comprises carbon dioxide and nitrogen, and the method achieves a carbon dioxide to nitrogen selectivity of at least 10.

18. The method of claim 16, wherein said aromatic polymer comprises polystyrene or a copolymer thereof.

19. The method of claim 16, wherein said aromatic polymer comprises a block copolymer of polystyrene and polybutadiene.

20. The method of claim 16, wherein at least a portion of said micropores are ultra-micropores having a size of less than 1 nm.

21. The method of claim 16, wherein the membrane has a thickness of no more than 100 microns.

22. The method of claim 16, wherein the membrane has a fluorine content of at least 20 wt %.

* * * * *